US012790855B2

(12) United States Patent
Barker et al.

(10) Patent No.: US 12,790,855 B2
(45) Date of Patent: Nov. 10, 2026

(54) LOCKSET INDICATOR ASSEMBLIES

(71) Applicant: Schlage Lock Company LLC, Carmel, IN (US)

(72) Inventors: Kenton H. Barker, Fort Collins, CO (US); Nathanael S. Murphy, Queen Creek, AZ (US); Austin Roup, Woodland Park, CO (US); Appu Jacob Varghese, Monument, CO (US)

(73) Assignee: Schlage Lock Company LLC, Carmel, IN (US)

( * ) Notice: Subject to any disclaimer, the term of this patent is extended or adjusted under 35 U.S.C. 154(b) by 93 days.

(21) Appl. No.: 18/655,767

(22) Filed: May 6, 2024

(65) Prior Publication Data

US 2025/0341117 A1 Nov. 6, 2025

Related U.S. Application Data

(60) Provisional application No. 63/464,021, filed on May 4, 2023, provisional application No. 63/464,003, filed (Continued)

(51) Int. Cl.
*E05B 41/00* (2006.01)
*E05B 1/00* (2006.01)

(52) U.S. Cl.
CPC ............ *E05B 41/00* (2013.01); *E05B 1/0084* (2013.01)

(58) Field of Classification Search
CPC ........ E05B 41/00; E05B 1/0084; E05B 17/10; E05B 17/0091
See application file for complete search history.

(56) References Cited

U.S. PATENT DOCUMENTS 289,196 A * 11/1883 Welsh ...................... E05B 41/00 40/907
369,639 A * 9/1887 Goodhue ................ G09F 13/34 40/907

(Continued)

FOREIGN PATENT DOCUMENTS

AT 122927 B * 5/1931
FR 355225 A * 10/1905

(Continued)

OTHER PUBLICATIONS

International Search Report and Written Opinion; International Searching Authority; International Application No. PCT/US2024/028020; Oct. 16, 2024; 6 pages.

(Continued)

*Primary Examiner* — Carlos Lugo
(74) *Attorney, Agent, or Firm* — Taft Stettinius & Hollister LLP

(57) ABSTRACT

An exemplary indicator assembly is configured for use with a lockset, and generally includes an indicator, an indicator lever, an actuating lever, and a slider. The indicator lever has a first indicator lever position in which the indicator lever causes the indicator to display a first indicium, and a second indicator lever position in which the indicator does not display the first indicium. The actuating lever is operable to cause an indicator lever movement as the actuating lever performs an actuating lever movement. The slider is operable to cause the actuating lever movement as the slider moves between a first slider position and a second slider position. The slider is configured to move from the first slider position to the second slider position in response to an actuating input provided by the lockset.

19 Claims, 13 Drawing Sheets

Related U.S. Application Data on May 4, 2023, provisional application No. 63/464,010, filed on May 4, 2023.

(56) References Cited

U.S. PATENT DOCUMENTS

| | | | | | |
|---|---|---|---|---|---|
| 481,960 | A * | 9/1892 | Lindström | E05B 41/00 40/907 |
| 624,278 | A * | 5/1899 | Whaley | E05B 41/00 40/907 |
| 689,429 | A * | 12/1901 | Smith | E05B 41/00 40/907 |
| 1,066,664 | A * | 7/1913 | Senior | E05B 41/00 40/907 |
| 1,099,106 | A * | 6/1914 | Wevat | E05B 41/00 40/907 |
| 1,810,468 | A * | 6/1931 | Doyle | E05B 41/00 70/433 |
| 2,455,208 | A * | 11/1948 | Wirth | E05B 41/00 40/907 |
| 6,938,445 | B2 * | 9/2005 | Huang | E05B 41/00 70/432 |
| 8,727,404 | B2 * | 5/2014 | Martin | E05B 17/005 292/341.14 |
| 9,016,910 | B2 * | 4/2015 | Bingle | E05B 17/10 362/459 |
| 9,169,669 | B2 * | 10/2015 | Clary | E05B 41/00 |
| 10,563,425 | B2 * | 2/2020 | Lunday | E05B 41/00 |
| 11,486,163 | B2 * | 11/2022 | Sweeney | E05B 15/02 |
| 11,781,347 | B2 * | 10/2023 | Berger | E05B 63/0017 292/173 |
| 12,234,668 | B2 * | 2/2025 | Hoiland | E05B 41/00 |
| 2011/0012378 | A1 * | 1/2011 | Ueno | E05B 85/16 428/595 |
| 2011/0016938 | A1 | 1/2011 | Chi | |
| 2015/0315816 | A1 | 11/2015 | Gopalakrishnan et al. | |
| 2020/0392760 | A1 * | 12/2020 | Gopalakrishnan | E05B 63/06 |
| 2020/0408002 | A1 | 12/2020 | Woodley et al. | |
| 2021/0207398 | A1 * | 7/2021 | Zamboni | E05B 41/00 |
| 2022/0235576 | A1 | 7/2022 | Basavaraju et al. | |
| 2022/0389740 | A1 * | 12/2022 | Hoiland | E05B 9/00 |
| 2023/0392413 | A1 * | 12/2023 | Hiremath | E05B 41/00 |
| 2025/0172014 | A1 * | 5/2025 | Sandoval, Jr. | E05B 15/02 |

FOREIGN PATENT DOCUMENTS

| | | | | |
|---|---|---|---|---|
| FR | 500300 | A * | 3/1920 | |
| KR | 820001297 | Y1 * | 6/1982 | E05B 41/00 |
| KR | 850002488 | Y1 * | 10/1985 | E05B 41/00 |
| KR | 102258951 | B1 * | 6/2021 | E05B 9/08 |

OTHER PUBLICATIONS

AU Examination Report No. 1; IP Australia: Australian Application No. 2024265035; Jul. 11, 2026; 4 pages.

* cited by examiner

LOCKSET INDICATOR ASSEMBLIES

CROSS-REFERENCE TO RELATED APPLICATIONS

The present application claims the benefit of U.S. Provisional Patent Application No. 63/464,003, filed May 4, 2023, of U.S. Provisional Patent Application No. 63/464,010, filed May 4, 2023, of U.S. Provisional Patent Application No. 63/464,021, filed May 4, 2023, and of U.S. patent application Ser. No. 18/655,713, filed May 6, 2024, the contents of each of which applications are incorporated by reference in their entirety.

TECHNICAL FIELD

The present disclosure generally relates to status-indicating access control devices, and more particularly but not exclusively relates to status-indicating locksets.

BACKGROUND

Status indicators are occasionally included in access control devices in order to provide a user with an indication regarding a state of the access control device, such as a locked/unlocked state. In the realm of mechanical status-indicating locksets, currently-available options generally fall into one of two categories, each of which has its own advantages and disadvantages.

Certain lower-cost locksets contain relatively small indicator signs that are constrained to remain within a predetermined footprint defined by the corresponding lockset type. For example, a status-indicating tubular lockset or status-indicating cylindrical lockset may include a circular rose in which the indicator sign is seated, and the rose may have a diameter similar to that of a non-status-indicating lockset. While such locksets have certain advantages (e.g., lower cost, simpler installation), they are also typically associated with certain disadvantages. Disadvantages can include reduced visibility and legibility due to sign limitations (size, location, and orientation of text/symbols), limited viewing angle, lower durability, limited applications (e.g., privacy function only), and/or susceptibility to tampering.

The marketplace also currently offers certain higher-cost locksets that include relatively large indicator signs designed to operate within a larger footprint, such as an elongated escutcheon. While such locksets have certain advantages (e.g., greater durability, enhanced visibility and legibility), they are also typically associated with certain disadvantages, such as higher cost, more complex installation, and/or special or non-standard door preparation.

In many situations, the cost of a higher performing indicator lock is prohibitive. As an example, a mortise lock indicator generally involves higher costs associated with: the lockset, the door preparation, and/or installation labor. A high-performing mortise lock with an indicator may cost a consumer three or more times the price of a status-indicating tubular or cylindrical lockset. However, lower-cost indicator locksets may be accompanied by substantially inferior performance and durability. For these reasons among others, there remains a need for further improvements in this technological field.

SUMMARY

An exemplary indicator assembly is configured for use with a lockset, and generally includes an indicator, an indicator lever, an actuating lever, and a slider. The indicator lever has a first indicator lever position in which the indicator lever causes the indicator to display a first indicium, and a second indicator lever position in which the indicator does not display the first indicium. The actuating lever is operable to cause an indicator lever movement as the actuating lever performs an actuating lever movement. The slider is operable to cause the actuating lever movement as the slider moves between a first slider position and a second slider position. The slider is configured to move from the first slider position to the second slider position in response to an actuating input provided by the lockset. Further embodiments, forms, features, and aspects of the present application shall become apparent from the description and figures provided herewith.

DETAILED DESCRIPTION OF ILLUSTRATIVE EMBODIMENTS

Figure 1:
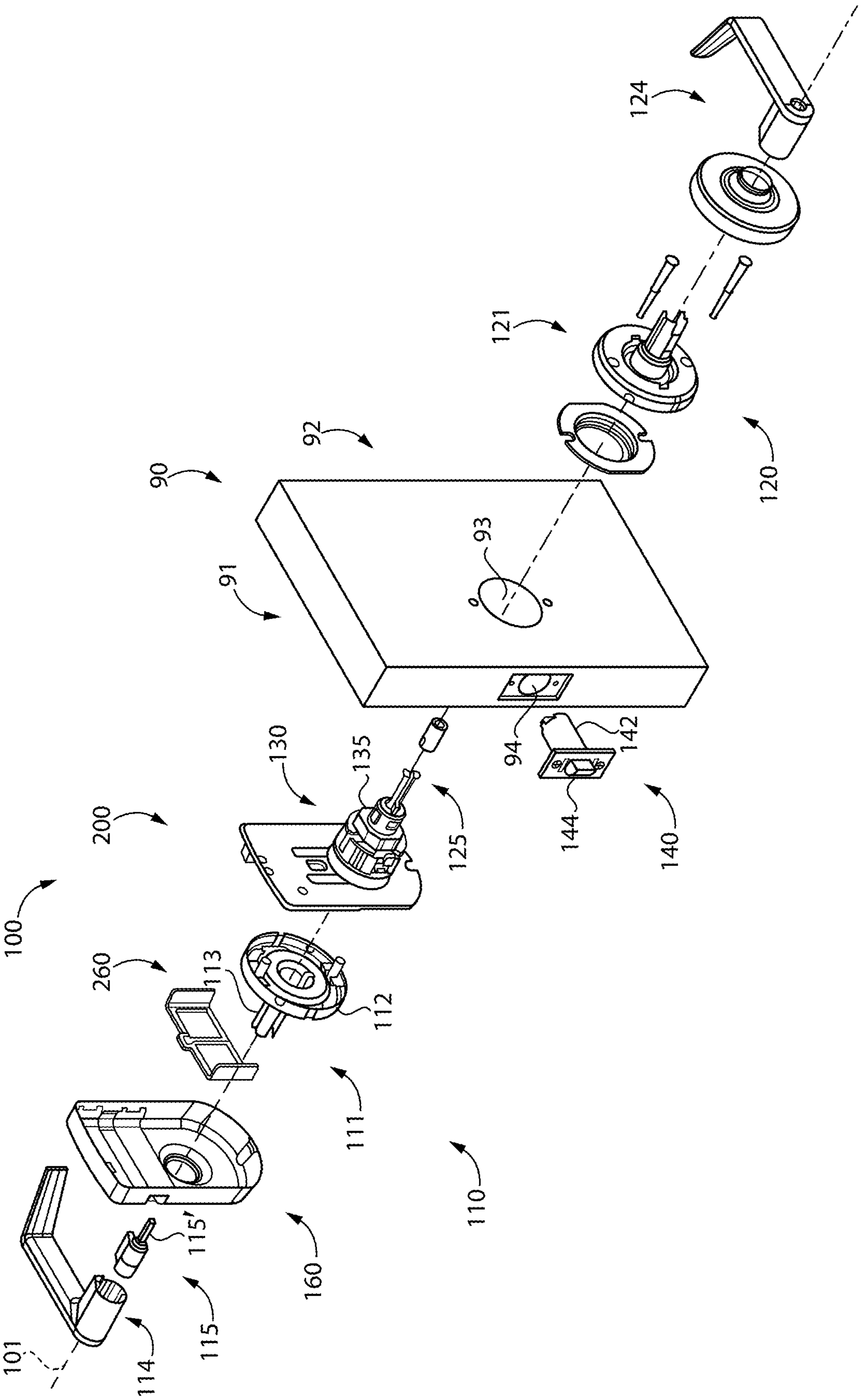
FIG. 1 is an exploded assembly view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a lockset 100 according to certain embodiments installed to a door 90. While the illustrated lockset 100 is of a cylindrical format, it should be appreciated that the concepts described herein may be utilized in connection with locksets of other formats, such as tubular, mortise, and/or hybrid. The door 90 generally includes a first side 91, a second side 92, and a door preparation including a cross-bore 93 and a latch bore 94. One of the first side 91 or the second side 92 is an egress or inner side of the door 90, while the other of the first side 91 or the second side 92 is a non-egress or outer side of the door 90.

The lockset 100 generally includes a first handleset 110 mounted to the first side 91 of the door 90, a second handleset 120 mounted to the second side 92 of the door 90, a chassis 130 seated in the cross-bore 93 and engaged with the first handleset 110 and the second handleset 120, and a latch mechanism 140 mounted in the latch bore 94 and engaged with the chassis 130. As described herein, the lockset 100 has a locked/unlocked state that defines whether the latch mechanism 140 can be actuated by an outside handle of the lockset 100, and the locked/unlocked state of the lockset 100 is defined by the locking/unlocking position of a control lug 135 of the chassis 130.

The illustrated lockset 100 includes an indicator assembly 200 that, as described herein, is configured to display a visual indication regarding the locked/unlocked state of the lockset 100, and which changes the displayed visual indication in response to an actuating movement transmitted by the chassis 130. In the illustrated form, the first handleset 110 includes the indicator assembly 200. It should be appreciated, however, that an indicator assembly 200 may additionally or alternatively be provided to the second handleset 120.

As noted above, the indicator assembly 200 is configured to change states in response to an actuating movement transmitted by the chassis 130. In certain embodiments, an indicator assembly 200 may be positioned on a first side of the chassis 130 (e.g., the egress or inner side of the chassis 130) such that the indicator assembly 200 can be actuated by a first moving component of the chassis 130. Additionally or alternatively, an indicator assembly 200 may be positioned on an opposite second side of the chassis 130 (e.g., the non-egress or outer side of the chassis 130) such that the indicator assembly 200 can be actuated by a different moving component of the chassis 130. In certain embodiments, the chassis 130 may be operable to actuate each and either of an interior indicator assembly and an exterior indicator assembly.

The first handleset 110 is mounted to the first side 91 of the door 90, and generally includes a first spring cage 111, a first handle 114 mounted to the first spring cage 111 for rotation about a longitudinal axis 101 of the lockset 100, a first lock state selector 115 operable to adjust the locked/unlocked state of the lockset 100, an escutcheon 160, and an indicator assembly 200 mounted in the escutcheon 160. The first spring cage 111 generally includes a spring cage housing 112 and a first drive spindle 113 rotatably mounted to the housing 112 and coupled with the first handle 114. While the illustrated first handle 114 is provided in the form of a lever, it should be appreciated that the first handle 114 may be provided in another form, such as that of a knob.

The second handleset 120 is mounted to the second side 92 of the door 90, and generally includes a second spring cage 121, and a second handle 124 mounted to the second spring cage 121 for rotation about the longitudinal axis 101. While the illustrated second handle 124 is provided in the form of a lever, it should be appreciated that the second handle 124 may be provided in another form, such as that of a knob. In the illustrated form, the second handleset 120 further includes a second lock state selector 125 operable to adjust the locked/unlocked state of the lockset 100. It should be appreciated that the second lock state selector 125 may be provided in the same form as the lock state selector 115 of the first handleset 110, or may be provided in another form.

In the illustrated form, each of the first handleset 110 and the second handleset 120 includes a corresponding and respective lock state selector 115, 125. In other embodiments, one of the handlesets 110, 120 may include a lock state selector while the other handleset 110, 120 does not include a lock state selector. Example forms of a lock state selector for an interior handleset include, for example, a pushbutton, a turn-button, a push-turn button, and a lock cylinder. Example forms of a lock state selector for an exterior handleset include, for example, an override mechanism, a recessed turn-button, a pin-actuated kickoff, and a lock cylinder. In the illustrated form, the first lock state selector 115 is provided in the form of an override mechanism including a plug that, when rotated, is operable to drive the control lug 135 from its locking position to its unlocking position. Additionally, the illustrated second lock state selector 125 is provided in the form of a pushbutton that, when depressed, moves the control lug 135 from its unlocking position to its locking position.

Figure 2:
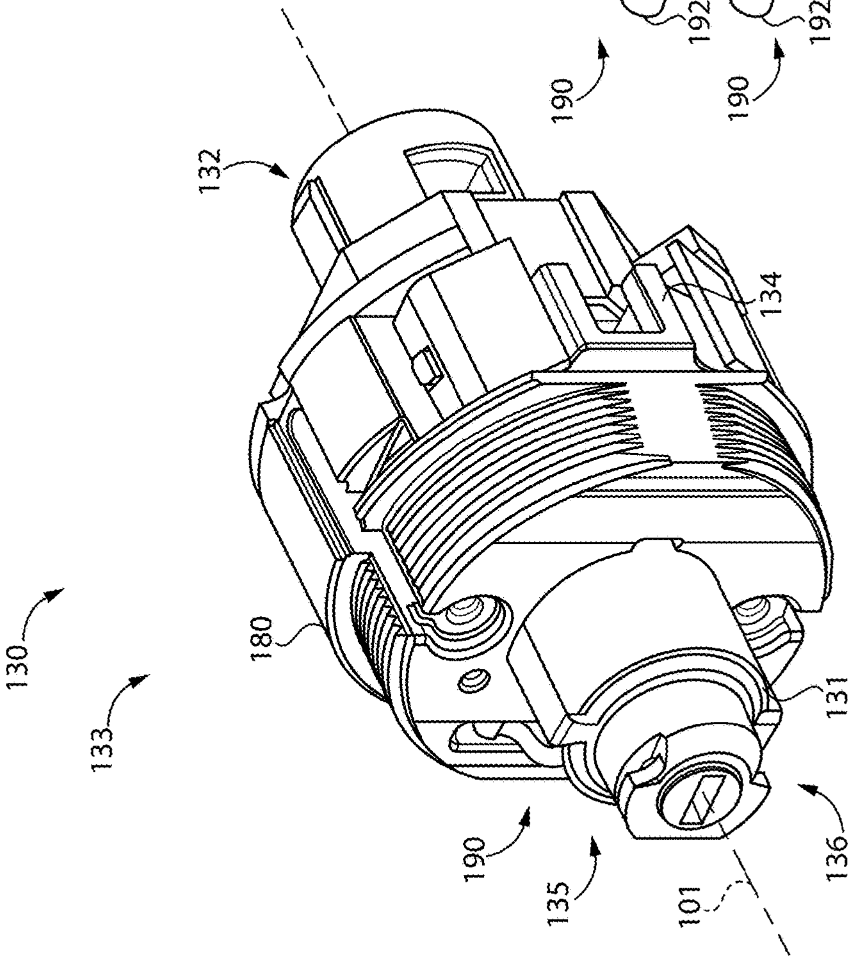
FIG. 2 is a perspective view of a chassis according to certain embodiments.

With additional reference to FIG. 2, the chassis 130 is mounted in the cross-bore 93, and generally includes a first chassis spindle 131, a second chassis spindle 132, a body portion 133 to which the spindles 131, 132 are mounted for independent rotation, a shuttle 134 mounted in the body portion 133 for sliding movement transverse to the longitudinal axis 101, a control lug 135 mounted in the body portion 133 for sliding longitudinal movement, and a cam assembly 136 operable to move the control lug 135 between a locking position and an unlocking position to thereby adjust the locked/unlocked state of the lockset 100. Each of the chassis spindles 131, 132 is engaged with the shuttle 134 such that the shuttle 134 retracts in response to rotation of each individual chassis spindle 131, 132. As described herein, the shuttle 134 is engaged with the latch mechanism 140 such that retraction of the shuttle 134 actuates the latch mechanism 140 and retracts the latchbolt 144.

One of the chassis spindles 131, 132 is an inside chassis spindle positioned on an interior side of the chassis 130, and the other of the chassis spindles 131, 132 is an outside chassis spindle positioned on an exterior side of the chassis 130. The inside chassis spindle 131/132 is connected with the inside handle 114/124 such that the inside handle 114/124 is at least selectively operable to rotate the inside chassis spindle 131/132 to thereby retract the shuttle 134. The outside chassis spindle 131/132 is connected with the outside handle 114/124 such that the outside handle 114/124 is selectively operable to rotate the outside chassis spindle 131/132 to thereby retract the shuttle 134.

The control lug 135 has a locking/unlocking position corresponding to the locked/unlocked state of the lockset 100. Stated another way, the control lug 135 is in a locking position when the lockset 100 is in the locked state, and is in an unlocking position when the lockset 100 is in the unlocked state. The control lug 135 in the locking position prevents the outside handle 114/124 from retracting the shuttle 134 and actuating the latch mechanism 140, while the control lug 135 in the unlocking position permits the outside handle 114/124 to retract the shuttle 134 and actuate the latch mechanism 140.

The cam assembly 136 is engaged with the control lug 135, and is configured to move the control lug 135 between its locking position and its unlocking position. In certain embodiments, the cam assembly 136 is configured to move the control lug 135 from its unlocking position to its locking position in response to a locking actuation of an inside lock state selector. As one example, the cam assembly 136 may longitudinally drive the control lug 135 from its unlocking position to its locking position in response to depression of a pushbutton lock state selector 125. In certain embodiments, the cam assembly 136 is configured to move the control lug 135 from its locking position to its unlocking position in response to an unlocking actuation of an outside lock state selector. As one example, the cam assembly 136 may longitudinally move the control lug 135 from its locking position to its unlocking position in response to rotation of a plug 115' of the lock state selector 115. Cam assemblies of this type are generally known in the art, and need not be described in further detail herein.

In certain embodiments, the chassis 130 may be configured to provide a "freewheel" locking state, in which the outside handle 114/124 is at all times free to rotate between its home position and its actuated position. In such forms, the control lug 135 in the locking position may decouple the outside handle 114/124 from the outside chassis spindle 131/132 to prevent actuation of the shuttle 134, and may rotationally couple the outside handle 114/124 to the outside chassis spindle 131/132 when in the unlocking position.

In certain embodiments, the chassis 130 may be configured to provide a "locked stationary" locking state, in which the outside handle 114/124 is free to rotate only when the lockset 100 is in the unlocked state. For example, the control lug 135 in the locking position may rotationally lock the outside handle 114/124 to the body portion 133, and may rotationally decouple the outside handle 114/124 from the body portion 133 to permit rotation of the outside handle 114/124 when in the unlocking position.

Figure 3:
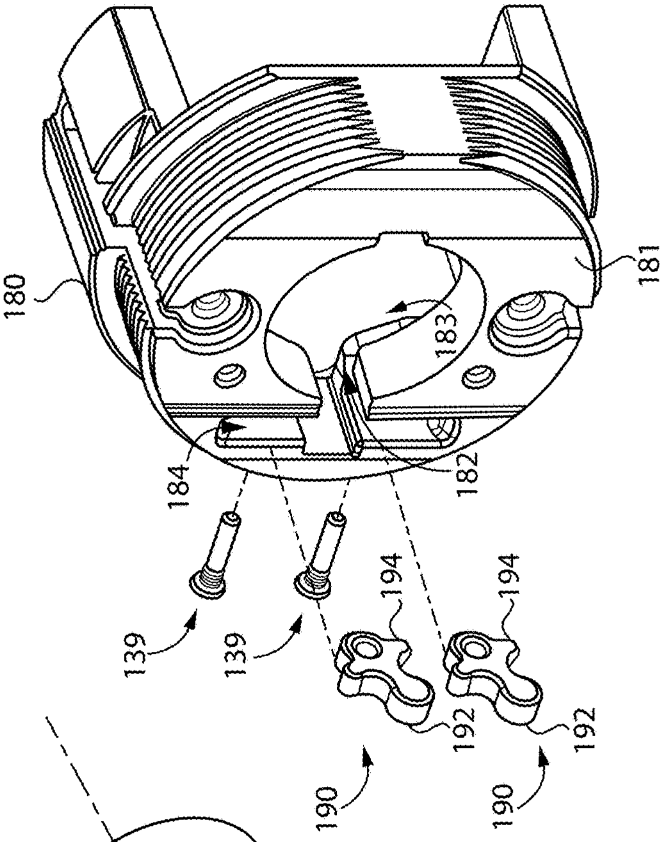
FIG. 3 is an exploded assembly view of a portion of the chassis illustrated in FIG. 2.

With additional reference to FIG. 3, the illustrated chassis body portion 133 includes a housing component 180 that pivotably supports at least one pivot crank 190. The housing component 180 includes a longitudinally-extending channel

182, a circumferential channel 183 behind the longitudinal channel 182, and a vertically-oriented trough 184. As described herein, a moving component 138 of the chassis 130 moves within the channels 182, 183, and the pivot cranks 190 are pivotably mounted in the trough 184. The pivot cranks 190 are one example of a rotary component that rotates as the lockset transitions between the first lockset state and the second lockset state.

The chassis 130 includes least one pivot crank 190 operable to actuate the indicator assembly 200 as the lockset 100 moves between its locked and unlocked states. In the illustrated form, the chassis 130 includes two pivot cranks 190, which may facilitate handing selection for the lockset 100 as described herein. Each pivot crank 190 is mounted to the chassis 130 for pivotal movement between a first pivot crank position and a second pivot crank position, and generally includes a first lobe 192 and at least one second lobe 194. For example, each pivot crank 190 may be pivotably mounted to the housing component 180 via a corresponding and respective pivot pin 139.

The first lobe 192 projects beyond an end face 181 of the housing component 180, and is operable to engage the indicator assembly 200 as described herein. The second lobe 194 is operable to project into the channel 182 such that a moving component 138 of the chassis 130 is operable to engage the second lobe 194 to thereby drive the pivot crank 190 from its first position to its second position. In the illustrated form, a length of the first lobe 192 is greater than a length of the second lobe 194 such that a displacement multiplication is achieved. Stated another way, the pivot crank 190 is operable to convert a relatively small input displacement (e.g., from the moving component 138 to the second lobe 194) to a relatively larger output displacement (e.g., from the first lobe 192 to the indicator assembly 200), thereby providing a mechanical advantage. As such, at least certain embodiments of the pivot crank 190 may be referred to as a mechanical amplifier.

In the illustrated form, the chassis 130 includes a first pivot crank 190 and a second pivot crank 190, which may facilitate adjustment of the lockset 100 between a first handing configuration and a second handing configuration. In each handing configuration, a corresponding one of the pivot cranks 190 is an active pivot crank that is operable to be engaged by the moving component 138, and the other of the pivot cranks 190 is an idle pivot crank that is not operable to be engaged by the moving component 138. In certain embodiments, the lockset 100 may have a first handing configuration in which the first pivot crank 190 is the active pivot crank and the second pivot crank 190 is the idle pivot crank. In order to transition the lockset 100 to a second handing orientation, the chassis 130 may be rotated 180° about the longitudinal axis 101 to an orientation in which the first pivot crank 190 is the idle pivot crank and the second pivot crank 190 is the active pivot crank.

As noted above, the active pivot crank 190 is operable to be engaged by a moving component 138 of the chassis 130 such that the pivot crank 190 pivots between a first pivot crank position and a second pivot crank position as the lockset 100 transitions between its locked state and its unlocked state. In certain embodiments, the moving component 138 that actuates the active pivot crank 190 is the control lug 135, for example as described with reference to FIGS. 13 and 14. In certain embodiments, the moving component 138 that actuates the active pivot crank 190 is a reversing lever 414, for example as described with reference to FIGS. 15-17.

Figure 5:
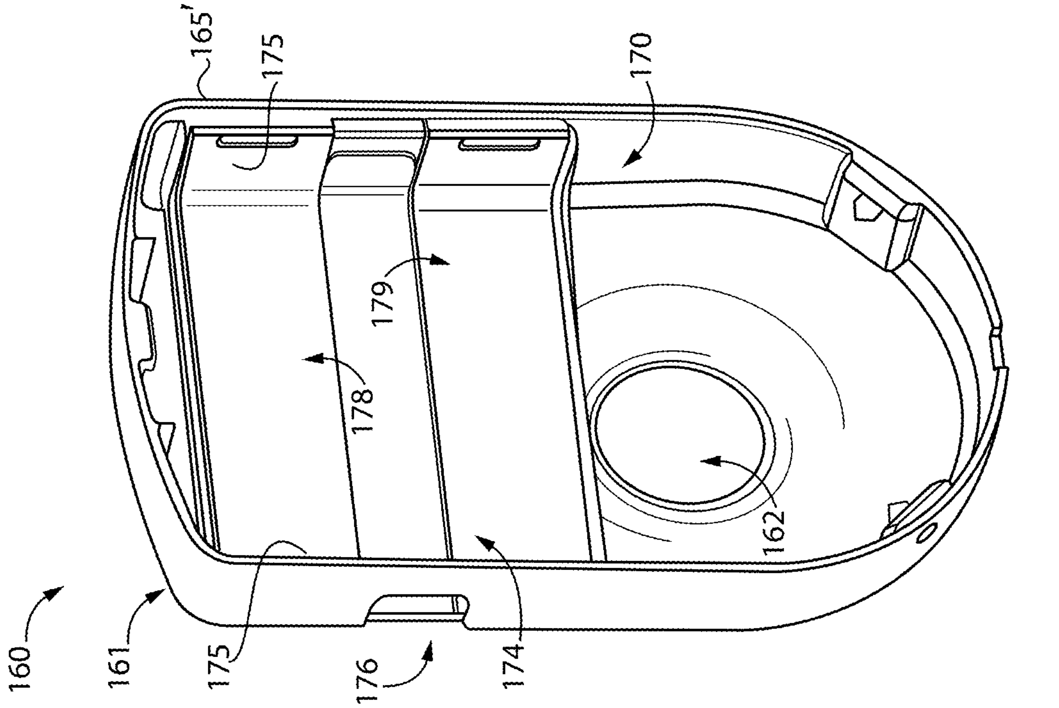
FIG. 5 is a rear perspective view of the escutcheon illustrated in FIG. 4.
Figure 4:
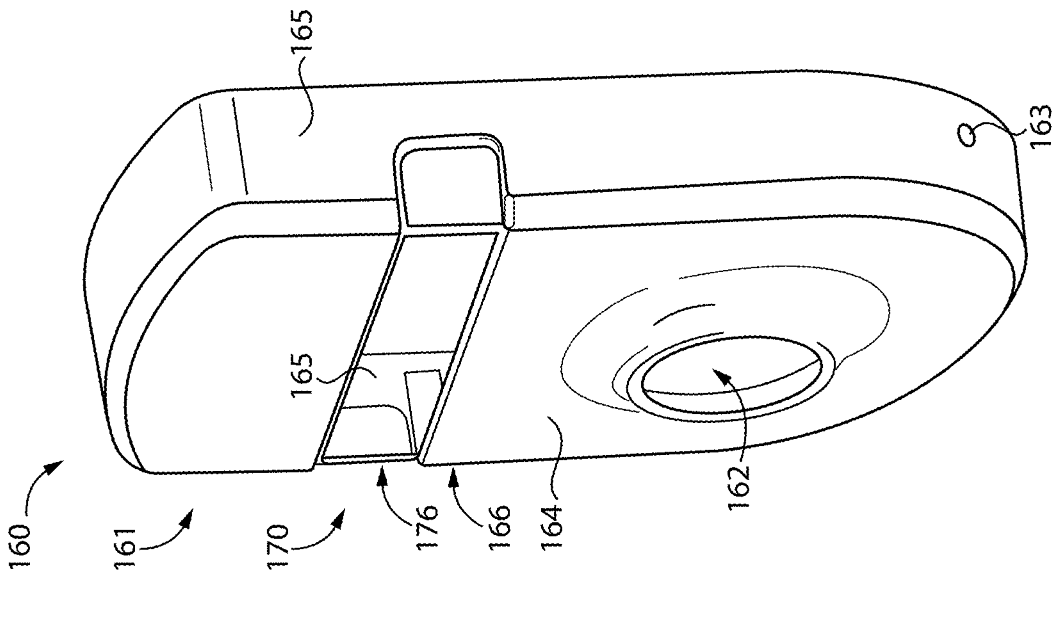
FIG. 4 is a perspective view of an escutcheon according to certain embodiments.

With additional reference to FIGS. 4 and 5, the escutcheon 160 generally includes a housing 161 and a transparent or translucent shield 170. The housing 161 includes a spindle aperture 162 through which the drive spindle 113 extends, a front wall 164, sidewalls 165, and a window 166 through which a portion of the indicator sign 260 is visible. In the illustrated form, the window 166 extends across the front wall 164 and into each of the sidewalls 165. In certain embodiments, these features may facilitate the viewing of the locked/unlocked status indication across a greater viewing angle, such as a viewing angle of at least 180°. It should also be appreciated that the window 166 may take another form, such as one that is confined to the front wall 164. In certain forms, the housing 161 may include a fastener aperture 163 operable to receive a fastener (e.g., a set screw) by which the housing 161 may be secured to the spring cage housing 112 to prevent rotation of the escutcheon 160 relative to the door 90. In certain forms, the housing 161 may be formed of a metal material.

The shield 170 is positioned at least partially within the housing 161, and generally includes a front panel 174, a pair of side panels 175 that extend rearward from the front panel 174, and a viewing area 176 that is aligned with the window 166. In certain embodiments, the viewing area 176 may be raised relative to the remainder of the front panel 174 such that material of the shield 170 projects into the window 166. In certain embodiments, the shield 170 may be formed of a transparent or translucent material. For example, the shield 170 may be formed of clear polycarbonate. In certain forms, the housing 161 may include one or more lips 165', which may abut the rear edges of the shield side panels 175 to restrict longitudinal movement of the shield 170 relative to the housing 161.

While other forms are contemplated, in the illustrated embodiment, the shield 170 is significantly larger than the window 166, and includes an upper portion 178 above the window 166 and a lower portion 179 below the window 166. In certain embodiments, each of the upper portion 178 and the lower portion 179 may have a corresponding and respective height in the range of 0.5 inch to 1.5 inch. The enlarged size of the shield 170 compared to the window 166 may serve one or more functions that may be desirable in certain embodiments. For example, the greater amount of material may improve part stiffness to resist deflection. In certain forms, the side panels 175 may abut a baseplate 210 of the indicator assembly 200 to further resist deflection, for example in the event that a user presses on the front face of the viewing area 176. Sidewall support from the baseplate 210 may additionally or alternatively resist squeezing of the viewing area 176 from the sides. Additionally or alternatively, the shield 170 may prevent the indicator sign 260 from rubbing against the rear side of the housing 161 as the sign 260 moves throughout its standard movement range. In certain embodiments, this provides a consistent and smooth bearing surface that at least partially surrounds the indicator sign 260 and facilitates the sliding movement thereof.

Figure 6:
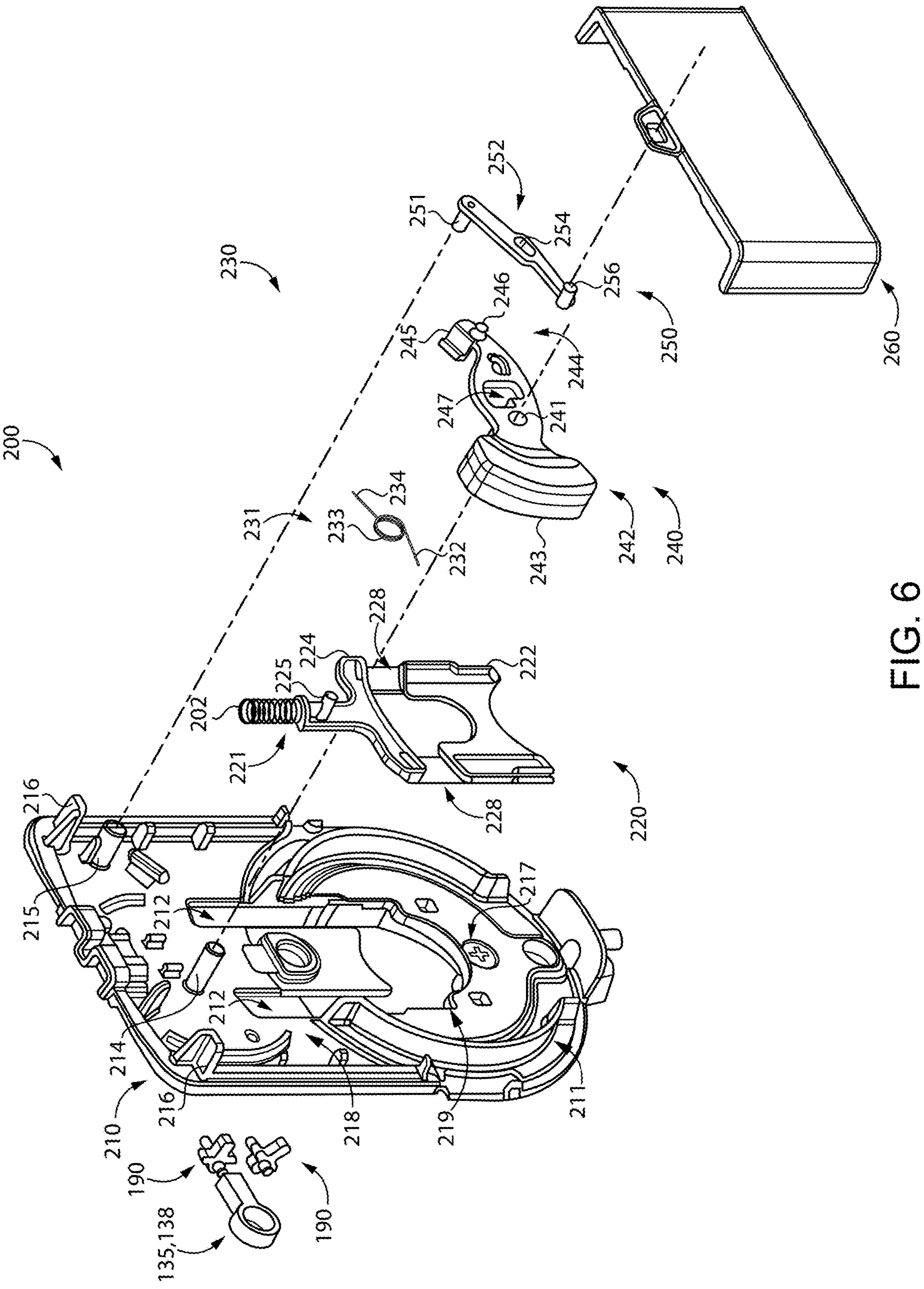
FIG. 6 is an exploded assembly view of an indicator assembly according to certain embodiments.

With additional reference to FIG. 6, the illustrated indicator assembly 200 generally includes a baseplate 210, a slider 220 slidably mounted to the baseplate 210, a transmission 230 engaged with the slider 220, and an indicator sign 260 slidably mounted in the escutcheon 160 and engaged with the transmission 230 such that the transmission 230 is operable to move the indicator sign 260 in response to movement of the slider 220. As described herein, the illustrated transmission 230 generally includes an actuating lever 240 pivotably mounted to the baseplate 210 and engaged with the slider 220, and an indicator lever 250 pivotably mounted to the baseplate 210 and engaged with each of the actuating lever 240 and the indicator sign 260.

The illustrated baseplate 210 includes a spring cage mounting location 211 in which the spring cage 111 is seated, and which defines a boundary between an exterior first region 218 and an interior second region 219. The baseplate 210 also includes a pair of vertically-oriented slots 212 that extend between the first region 218 outside the mounting location 211 and the second region 219 within the mounting location 211. The baseplate 210 also includes a first mounting post 214 to which the actuating lever 240 is pivotably mounted, and a second mounting post 215 to which the indicator lever 250 is mounted. In the illustrated embodiment, the baseplate 210 further includes a pair of stops 216 configured to limit the travel of the indicator sign 260 in the upward direction. In certain forms, the baseplate 210 may include one or more fastener apertures 217 through which the baseplate 210 may be coupled with the chassis 130 by an appropriate fastener, such as a screw.

The slider 220 is mounted to the baseplate 210 for sliding movement along a slider axis 220' between a first slider position and a second slider position, and may be biased toward the first slider position by a bias member 202. While the illustrated bias member 202 is provided in the form of a compression spring, it should be appreciated that the bias member 202 may be provided in another form, such as one including an extension spring, a torsion spring, a leaf spring, an elastic member, and/or magnets. In the illustrated form, the bias member 202 is captured between the baseplate 210 and the slider 220 to thereby bias the slider 220 downward toward the first slider position. In certain embodiments, the slider 220 may include a post 221 to which the bias member 202 may be mounted.

Figure 8:
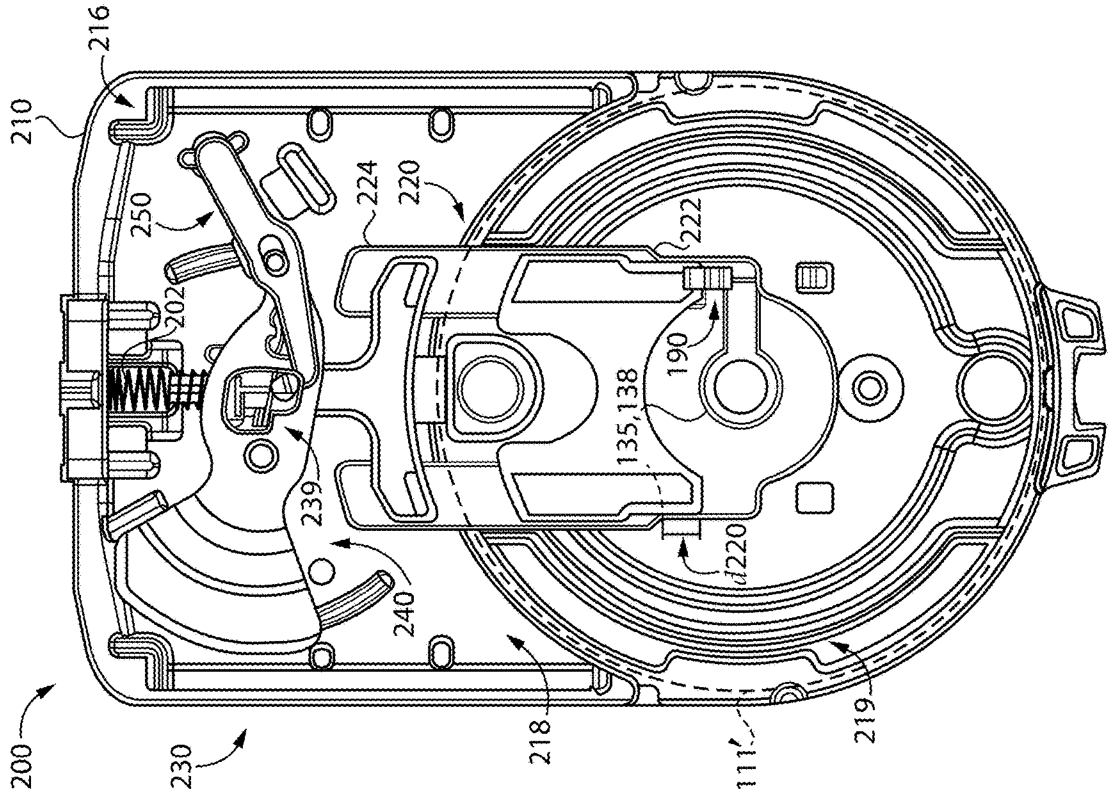
FIG. 8 is a front view of an indicator assembly in a first state.

With additional reference to FIG. 8, the slider 220 includes a lower portion 222, an upper portion 224, and a pair of legs 228 extending between and connecting the lower portion 222 and the upper portion 224. The lower portion 222 is seated within the second region 219 and the footprint 111' of the spring cage 111, and receives the actuating input from the chassis 130 as described herein. The upper portion 224 is positioned in the first region 218 and outside of the spring cage 111, and is operable to engage the transmission 230 as described herein. The upper portion 224 may include a post 225 through which the slider 220 engages the transmission 230 as described herein. The legs 228 are recessed relative to the lower portion 222 and the upper portion 224, which may permit the legs 228 to be positioned within the slots 212 and behind the lip of the spring cage housing 112 such that the slider 220 is operable to slide between its first and second positions without interference from the spring cage 111.

The illustrated transmission 230 generally includes the actuating lever 240, the indicator lever 250, and an anti-jam spring 231. In the illustrated form, the anti-jam spring 231 generally includes a first leg 232, a second leg 234, and a coiled body portion 233 connected between the legs 232, 234. The body portion 233 is mounted to a post of the actuating lever 240 such that the spring 231 travels with the actuating lever 240. The first leg 232 engages the post 225 of the slider 220, and the second leg 234 engages a flange 245 of the actuating lever 240 such that movement of the slider 220 from the first slider position to the second slider position causes the anti-jam spring 231 to urge the actuating lever 240 to perform a first actuating lever movement from a first actuating lever position to a second actuating lever position as described herein.

The illustrated actuating lever 240 generally includes a mounting feature 241, a first arm 242 positioned on a first side of the mounting feature 241, and a second arm 244 positioned on an opposite second side of the mounting feature 241. The mounting feature 241 is engaged with the mounting post 214 such that the baseplate 210 supports the actuating lever 240 for pivotal movement between a first actuating lever position and a second actuating lever position. In the illustrated form, the first arm 242 includes a counterweight 243 which, as described herein, aids in biasing the actuating lever 240. In certain embodiments, at least 60 percent, at least 70 percent, or at least 80 percent of the mass of the actuating lever 240 may be provided by the counterweight 243. The second arm 244 includes a flange 245 that projects rearward from the second arm 244 and provides an anchor point for the second leg 234, and a post 246 that projects forward from the second arm 244 for engagement with the indicator lever 250.

The actuating lever 240 is engaged with the slider 220 via a lost motion connection 239 and the anti-jam spring 231. In the illustrated form, the lost motion connection 239 is defined in part by the slider post 225, and in part by an aperture 247 in the actuating lever 240. The aperture 247 is significantly larger than the post 225 such that the slider 220 is capable of performing the first slider movement (e.g., movement from the first slider position to the second slider position) without causing a corresponding movement of the actuating lever 240. When the actuating lever 240 is free to perform its first movement (e.g., movement from the first actuating lever position to the second actuating lever position), the anti-jam spring 231 causes the first actuating lever movement in response to the first slider movement. When the first actuating lever movement is blocked, the anti-jam spring 231 deforms such that the first slider movement is permitted even when the actuating lever 240 is blocked from performing its first movement.

The illustrated indicator lever 250 generally includes a mounting feature 251 and an arm 252 that extends from the mounting feature 251 to a bearing post 256 through which the indicator lever 250 may engage the indicator sign 260. The indicator lever 250 also includes an aperture 254 into which the post 246 of the actuating lever 240 projects. As described herein, the indicator lever 250 is configured to perform a first indicator lever movement (e.g., movement from a first indicator lever position to a second indicator lever position) in response to a first actuating lever movement (e.g., movement of the actuating lever 240 from the first actuating lever position to the second actuating lever position) to thereby cause the indicator sign 260 to perform a first indicator sign movement (e.g., from the first indicator sign position to the second indicator sign position).

In the illustrated form, the actuating lever 240 and the indicator lever 250 are mounted for pivotal movement about two different axes. More particularly, the actuating lever 240 is mounted for pivotal movement about a first axis defined by the first mounting post 214, and the indicator lever 250 is mounted for pivotal movement about a second axis defined by the second mounting post 215. In certain embodiments, this arrangement may provide for a mechanical advantage to the movement of the indicator sign 260 such that a smaller displacement of the slider 220 results in a larger displacement of the indicator sign 260. In various embodiments, the mechanical advantage may be provided such that the indicator sign displacement d260 is at least twice the slider displacement d220, at least three times the slider displacement d220, or at least six times the slider displacement d220. The transmission 230 may thus be considered an example of a mechanical amplifier that causes the indicator sign 260 to move by a greater distance d260 in response to movement of a movable component (e.g., the slider 220) by a lesser distance d220.

Figure 7:
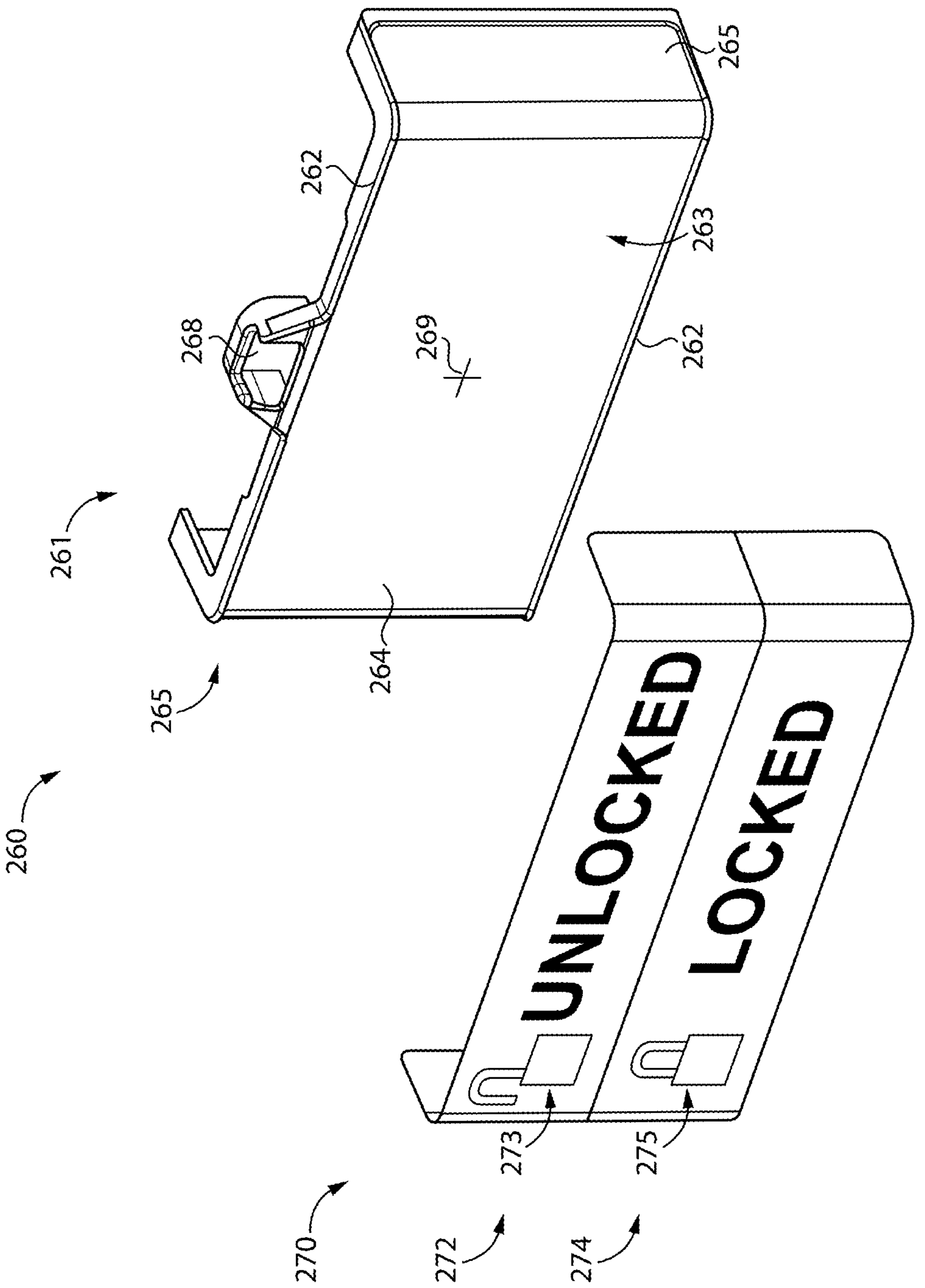
FIG. 7 is an exploded view of an indicator sign according to certain embodiments.

With additional reference to FIG. 7, illustrated therein is an example form of indicator sign 260. The illustrated sign 260 generally includes a frame 261 and a label 270. The frame 261 includes a front wall 264, a pair of sidewalls 265 extending rearward from the front wall, and an opening 268 configured to receive the bearing post 256 of the indicator lever 250. In the illustrated form, the opening 268 is vertically aligned with the center of mass 269 of the indicator sign 260. It has been found that lifting from a point above the center of mass 269 reduces the amount of sideways tipping as the sign 260 moves along its travel path. A reduction in tipping can also reduce the chances of the sign 260 binding against the baseplate 210. The reduction in tipping can additionally or alternatively reduce the operating forces for lifting the sign 260, especially at the top of the travel, when the sign 260 is pushed against the stops 216 of the baseplate 210. In certain forms, the opening 268 is vertically aligned with the center of mass 269. In certain embodiments, the opening 268 is substantially vertically aligned with the center of mass 269. As used herein, "substantially vertically aligned" indicates that the opening 268 or other attachment point is directly in line with the center of mass 269 to within +/−20% of the overall width of the sign 260.

The label 270 generally includes a first indicating region 272 including first indicia 273 relating to a first state of the lockset 100 (e.g., the unlocked state), and a second indicating region 274 including second indicia 275 relating to a second state of the lockset 100 (e.g., the locked state). The label 270 is sized and shaped to extend across the front wall 264 and onto the sidewalls 265 such that each sidewall 265 includes a corresponding and respective portion of each indicating region 272, 274.

In certain embodiments, the frame 261 may include one or more lips 262 that define a slightly recessed area 263 in which the label 270 is seated. Such lip(s) 262 may provide a protective standoff for the label 270 to thereby discourage the label 270 from rubbing against the rear side of the shield 170 as the sign 260 moves between its first and second positions.

The indicator sign 260 is mounted in the escutcheon 160 for movement between a first indicator sign position and a second indicator sign position. While other forms are contemplated, in the illustrated form, the indicator sign 260 is mounted for movement along a vertical indicator sign axis 260' between the first indicator sign position and the second indicator sign position. When the indicator sign 260 is in the first indicator sign position, the first indicating region 272 is aligned with the escutcheon window 166 such that the first indicia 273 are visible through the viewing area 176. When the indicator sign 260 is in the second indicator sign position, the second indicating region 274 is aligned with the escutcheon window 166 such that the second indicia 275 are visible through the viewing area 176. As described herein, the indicator assembly 200 is configured to move the indicator sign 260 between its first and second positions in response to an actuating movement imparted by the chassis 130.

As noted above, the illustrated indicator sign 260 is provided as a multi-piece construction, in which a label 270 is adhered to a frame 261. This arrangement may provide one or more advantages. As one example, the multi-piece construction may enable the frame 261 to be formed separately from the indicia-bearing component (e.g., the label 270), thereby allowing any desired geometry to be molded into the frame 261 without concern about introducing cosmetic defects into the indicator sign graphics. In certain embodiments, the frame 261 may be formed of a resin having properties that are preferred for a functional part.

In the illustrated form, each indicating region 272, 274 includes plural indicia, each relating to the corresponding state of the lockset 100. For example, the first indicating region 272 includes one or more first indicia 273, which in the illustrated form include a first symbol (an unlocked padlock), a first word ("UNLOCKED") and a first background color (white). Each of these first indicia 273 may serve to indicate to the user that the lockset 100 is unlocked when the first indicating region 272 is aligned with the window 166. Similarly, the second indicating region 274 includes one or more second indicia 275, which in the illustrated form includes a second symbol (a locked padlock), a second word ("LOCKED"), and a second background color (red). Each of these second indicia 275 may serve to indicate to the user that the lockset 100 is locked when the second indicating region 274 is aligned with the window 166. It should be appreciated, however, that additional and/or alternative forms of indicia may be used in connection with the first indicating region 272 and/or the second indicating region 274.

As described herein, in the illustrated embodiment, a mechanical indicator sign 260 is slidably mounted in the escutcheon 160 to selectively display one or more indicia relating to one or more states of the lockset 100, and is actuated by the transmission 230. It is also contemplated that the transmission 230 may be utilized to actuate other form of indicators, such as electronic ink displays, light emitting diode (LED) displays, liquid crystal displays (LCDs), lights, buzzers, speakers, or another form of visual and/or audible indicator.

Figure 9:
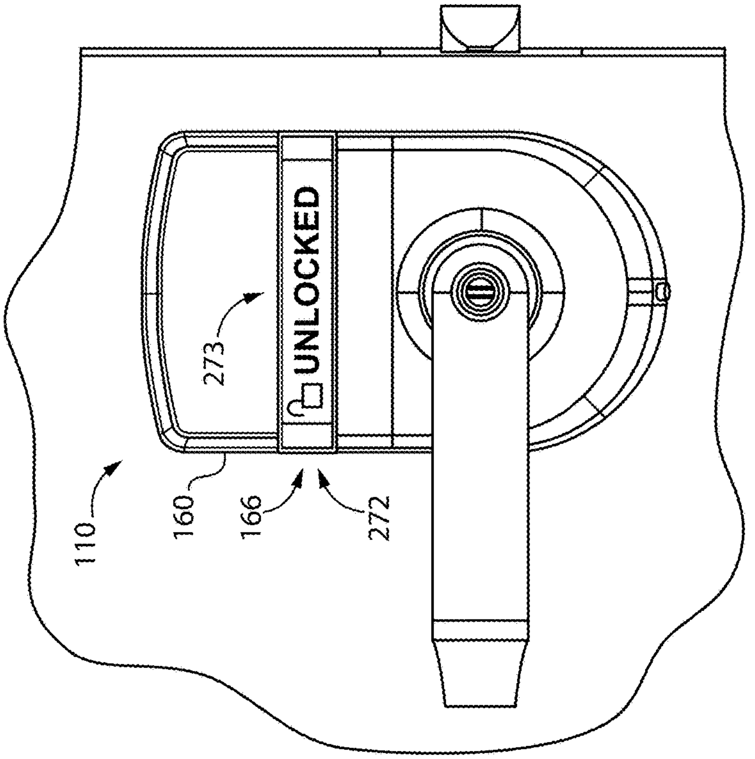
FIG. 9 is a front view of a handleset with the indicator assembly in the first state.

With additional reference to FIGS. 8 and 9, illustrated therein are selected portions of the lockset 100 with the lockset 100 in its unlocked state. In this first state, each of the slider 220, the actuating lever 240, the indicator lever 250, and the indicator sign 260 is in the corresponding and respective first position thereof. In certain embodiments, the bias member 202 may bias the movable components of the indicator assembly 200 to its first state, for example by biasing the slider 220 downward toward its first position. With the indicator sign 260 in its first position, the first indicating region 272 is aligned with the window 166 such that the first indicia 273 are displayed to provide the user with a visual indication that the lockset 100 is unlocked.

Figure 11:
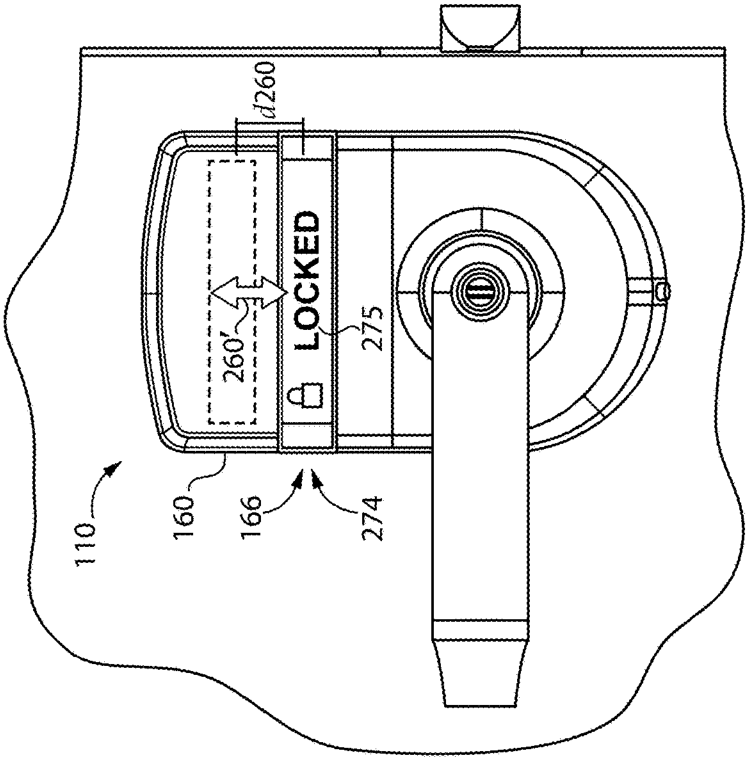
FIG. 11 is a front view of the handleset with the indicator assembly in the second state.
Figure 10:
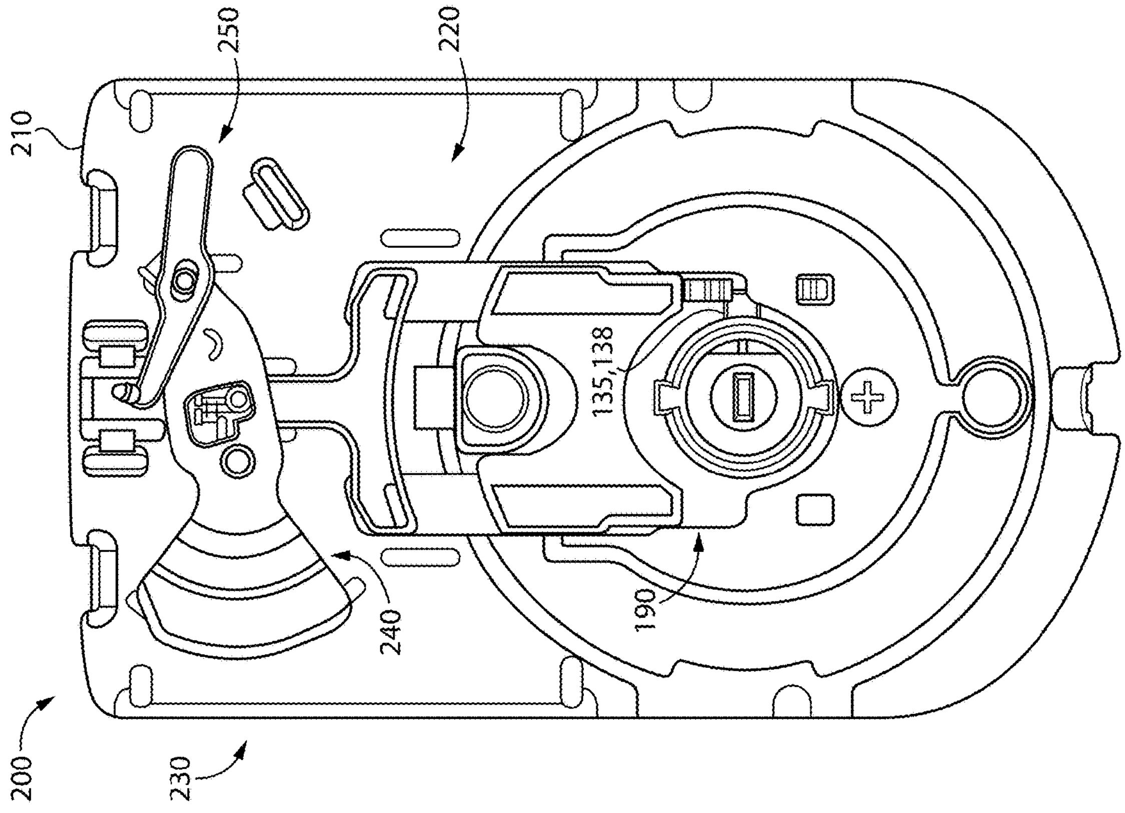
FIG. 10 is a front view of the indicator assembly in a second state.

With additional reference to FIGS. 10 and 11, illustrated therein are selected portions of the lockset 100 with the lockset 100 in its locked state. In this second state, each of the slider 220, the actuating lever 240, the indicator lever 250, and the indicator sign 260 is in the corresponding and respective second position thereof. With the indicator sign 260 in its second position, the second indicating region 274 is aligned with the window 166 such that the second indicia 275 are displayed to provide the user with a visual indication regarding the locked state of the lockset 100.

In the illustrated configuration, the movable components of the indicator assembly 200 occupy their corresponding and respective first positions when the lockset 100 is in the unlocked state, and the occupy their corresponding and respective second positions when the lockset 100 is in the locked state. It is also contemplated that this arrangement may be reversed such that the first positions correspond to the locked state and the second positions correspond to the unlocked state. Additionally, various movable components of the indicator assembly 200 are operable to move between a first position and a second position. In certain forms, a movable component may be considered capable of performing a first movement and a second movement to move between the first and second positions. For example, a component may perform or undergo a first movement in a first direction while moving from the first position to the second position, and may perform or undergo a second movement in a second direction opposite the first direction when moving from the second position to the first position.

As noted above, the chassis 130 includes a movable component 138 (e.g., a control lug 135) that moves between a locking position and an unlocking position as the lockset 100 transitions between its locked state and its unlocked state. Thus, the movable component 138 is in its unlocking position in the first state illustrated in FIGS. 8 and 9, and is in its locking position in the second state illustrated in FIGS. 10 and 11. As the movable component 138 undergoes an unlocking movement from its locking position to its unlocking position, the movable component 138 engages the second lobe 194 of the active pivot crank 190, thereby pivoting the active pivot crank 190 from its first position to its second position. Such movement of the pivot crank 190 causes the first lobe 192 to engage the slider 220 to thereby initiate a first movement of the slider 220 from its first position to its second position.

Upward movement of the slider 220 against the force of the bias member 202 causes the post 225 to drive the first arm 232 of the anti-jam spring 231 upward, thereby causing the spring 231 to urge the actuating lever 240 toward its second position. Should such movement of the actuating lever 240 be blocked (e.g., if the sign 260 becomes jammed and prevents pivoting of the indicator lever 250), the anti-jam spring 231 deforms, thereby permitting the slider 220 to complete its first movement even when the actuating lever 240 is blocked from movement. Should the obstruction be removed while the slider 220 is in its second position, the spring 231 may release its stored mechanical energy and drive the actuating lever 240 to its second position.

As should be evident from the foregoing, when the transmission 230 is unjammed, the first movement of the slider 220 from the first slider position to the second slider position causes a corresponding first movement of the actuating lever 240 from the first actuating arm position to the second actuating arm position. The counterweight 243 may aid in this first actuating arm movement. Due to the engagement of the post 246 with the aperture 254, this first movement of the actuating lever 240 in turn causes a corresponding first movement of the indicator lever 250 from the first indicator arm position toward the second indicator arm position. The first movement of the indicator lever 250 is transmitted to the indicator sign 260 via engagement of the bearing post 256 with the opening 268, thereby causing a first movement of the indicator sign 260 from the first indicator sign position to the second indicator sign position.

Movement of the lockset 100 from the locked state to the unlocked state causes the movable component 138 to return to its unlocking position, thereby permitting the active pivot crank 190 to return to its first position as the slider 220 performs a second slider movement from its second position to its first position under the force of the bias member 202. This second movement of the slider 220 causes a corresponding second movement of the actuating lever 240 from the second actuating arm position to the first actuating arm position. In response to the second actuating arm movement, the indicator lever 250 performs a corresponding second movement from the second indicator arm position to the first indicator arm position, thereby causing a second movement of the indicator sign 260 from the second indicator sign position to the first indicator sign position.

In certain forms, the slider 220 may be permitted a certain amount of over-travel relative to the indicator sign 260. In the illustrated form, the slider 220 continues to move upward after the sign 260 reaches the upper stops 216, which places a preload on the spring 231 and retains a snug engagement between the sign 260 and the stops 216. The over-travel may additionally or alternatively allow the design to compensate for tolerance variations and wear of the transmission components over time, as the sign 260 will still be pushed against the upper stops 216 even when there is part-to-part variation in the transmission components, or wear of the transmission components over time.

Figure 12:
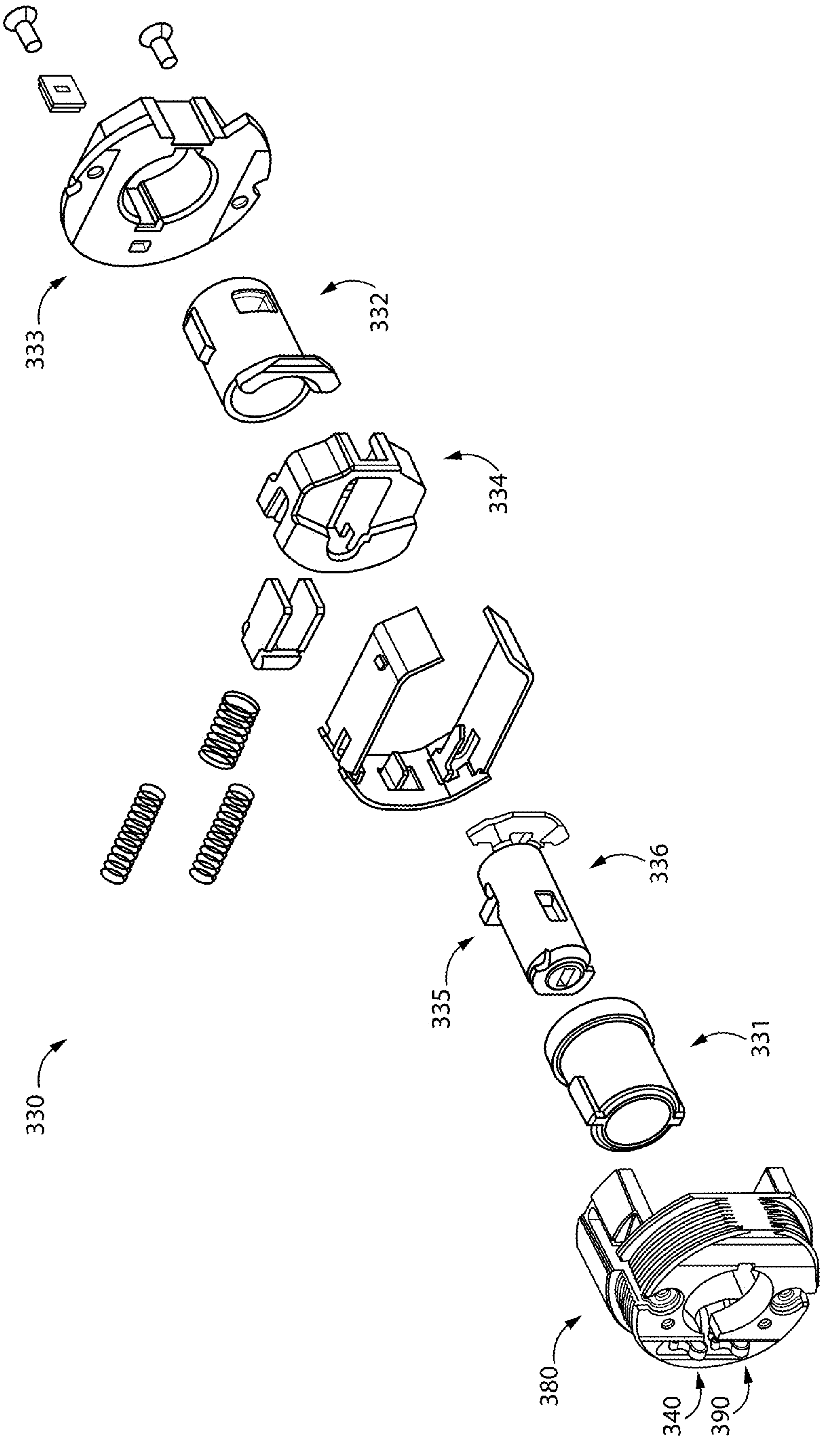
FIG. 12 is an exploded view of a lockset chassis according to certain embodiments.

With additional reference to FIG. 12, illustrated therein is a chassis 330 that may be utilized as the chassis 130 in certain embodiments. The chassis 330 generally includes a first chassis spindle 331, a second chassis spindle 332, a body portion 333, a shuttle 334, a control lug 335, a keycam shell 336, a housing component 380, and a pair of pivot cranks 390, which respectively correspond to the first chassis spindle 131, second chassis spindle 132, body portion 133, shuttle 134, control lug 135, cam assembly 136, housing component 180, and pivot cranks 190 of the above-described chassis 130. While other forms are contemplated, in the illustrated embodiment, the first chassis spindle 331 is an outside chassis spindle configured for engagement with an exterior handle, the second chassis spindle 332 is an inside chassis spindle configured for engagement with an interior handle, and the housing component 380 (including the pivot cranks 390) is positioned on the exterior side of the chassis 330.

Figure 14:
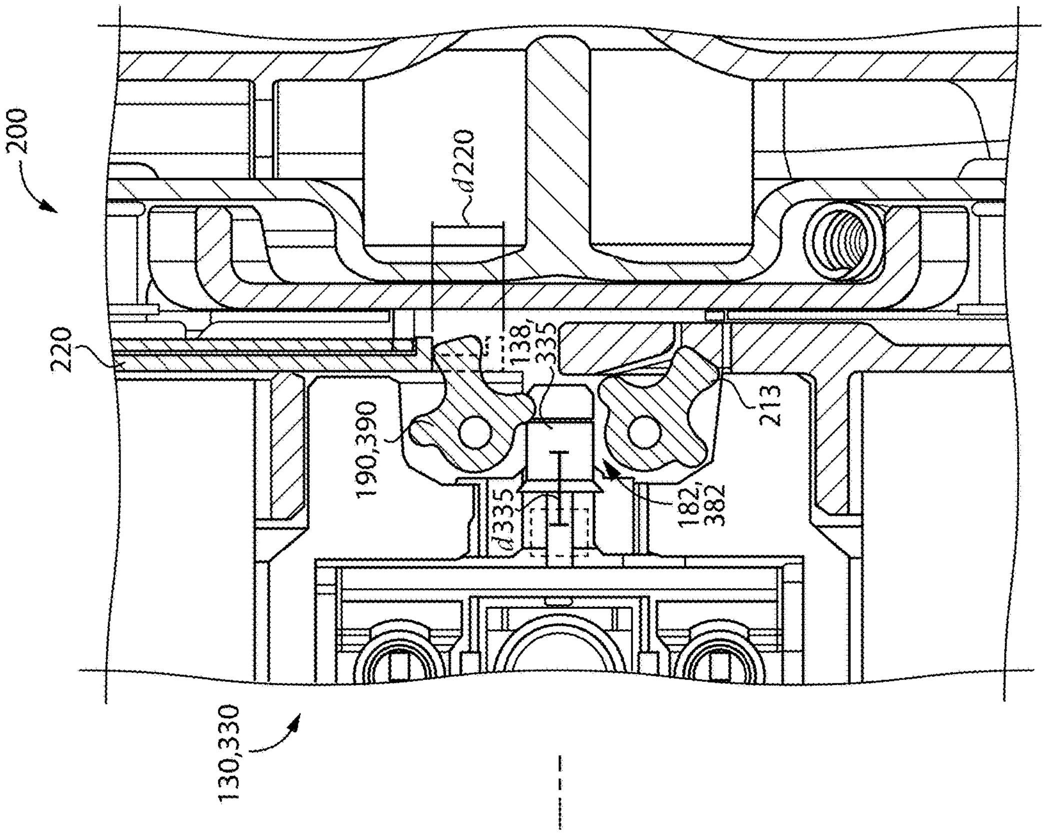
FIG. 14 is a cross-sectional view of the portion of the lockset in a second lockset state, in which the lockset places the indicator assembly in a second indicator assembly state.
Figure 13:
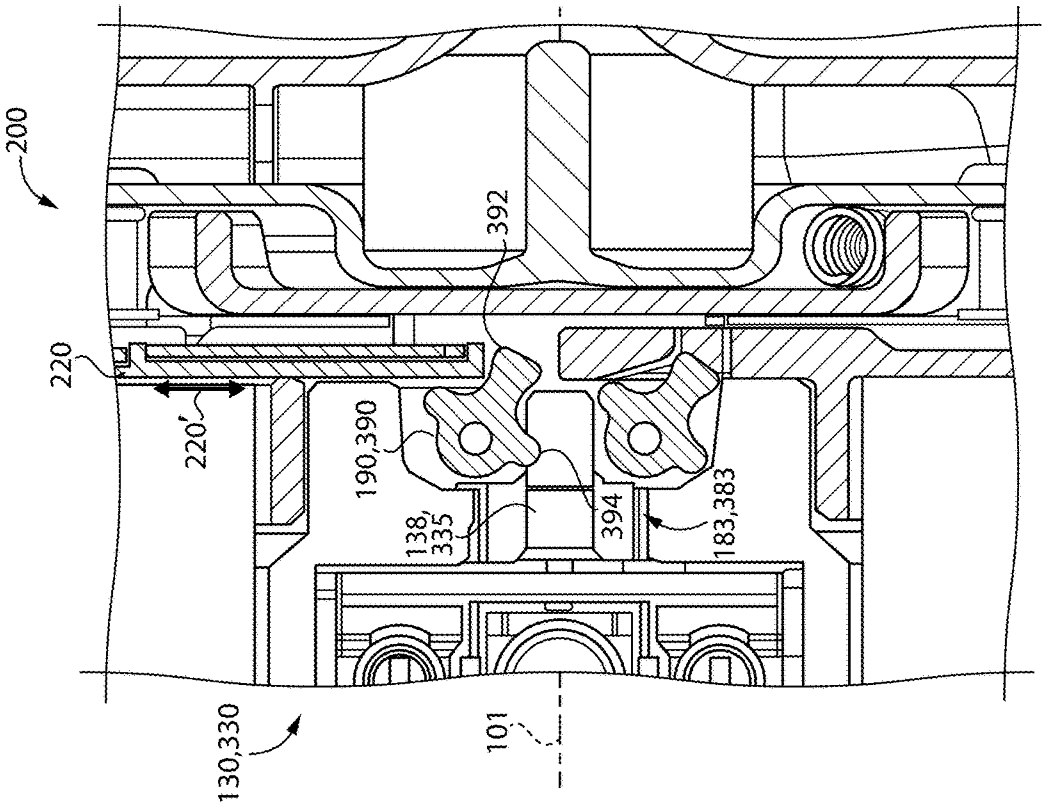
FIG. 13 is a cross-sectional view of a portion of a lockset in a first lockset state, in which the lockset places an indicator assembly in a first indicator assembly state.

With additional reference to FIGS. 13 and 14, the chassis 330 may be utilized as the chassis 130, for example in embodiments in which the consumer wishes for the lockset 100 to include an indicator assembly 200 on the exterior side of the lockset 100. In such forms, the control lug 335 serves as the moving component 138 that engages the active pivot crank 190, 390. With the moving control lug 138, 335 in a first (e.g., unlocking) position (FIG. 13), the moving control lug 138, 335 is disengaged from the active pivot crank 190, 390 such that the active pivot crank 190, 390 adopts the first pivot crank position, thereby causing the indicator assembly 200 to adopt the first state illustrated in FIGS. 8 and 9.

As the moving control lug 138, 335 moves to a second (e.g., locking) position (FIG. 14), the moving control lug 138, 335 engages the second lobe 392 and pivots the active pivot crank 190, 390, thereby causing the active pivot crank 190, 390 to drive the slider 220 upward to the second slider position. As a result, the indicator assembly 200 is driven to the second state illustrated in FIGS. 10 and 11. In certain embodiments, the baseplate 210 may include a recess 213 that receives at least a portion of the idle pivot crank 190, 390 to ensure that the idle pivot crank 190, 390 does not interfere with operation of the indicator assembly 200 or other components of the lockset 100.

In the illustrated form, the first position (FIG. 13) is an unlocking position, and the second position (FIG. 14) is a locking position. With the control lug 138 in the unlocking position, the control lug 138 is aligned with the circumferential channel 183, 383 such that the control lug 138 is operable to rotate relative to the housing component 380 to thereby transfer torque from the spindle 331 to the keycam shell 336 for retraction of the shuttle 334 and actuation of the latch mechanism. With the control lug 138 in the locking position, by contrast, the control lug 138 is received in the longitudinal channel 182, 382 such that the control lug 138 is rotationally locked to the housing component 380. In certain forms, the chassis 330 may be provided as a locked stationary chassis, in which the outside chassis spindle 331 is configured to be locked in a fixed orientation when the lockset is in its locked state. Certain exemplary features of a locked stationary spindle 1100 are described herein with reference to FIGS. 18 and 19. It is also contemplated that the chassis 330 may be provided as a freewheeling chassis, in which the outside chassis spindle 331 is permitted a certain degree of rotation when the lockset is in its locked state. Certain exemplary features of a freewheeling spindle 1200 are described herein with reference to FIGS. 20 and 21.

Figure 15:
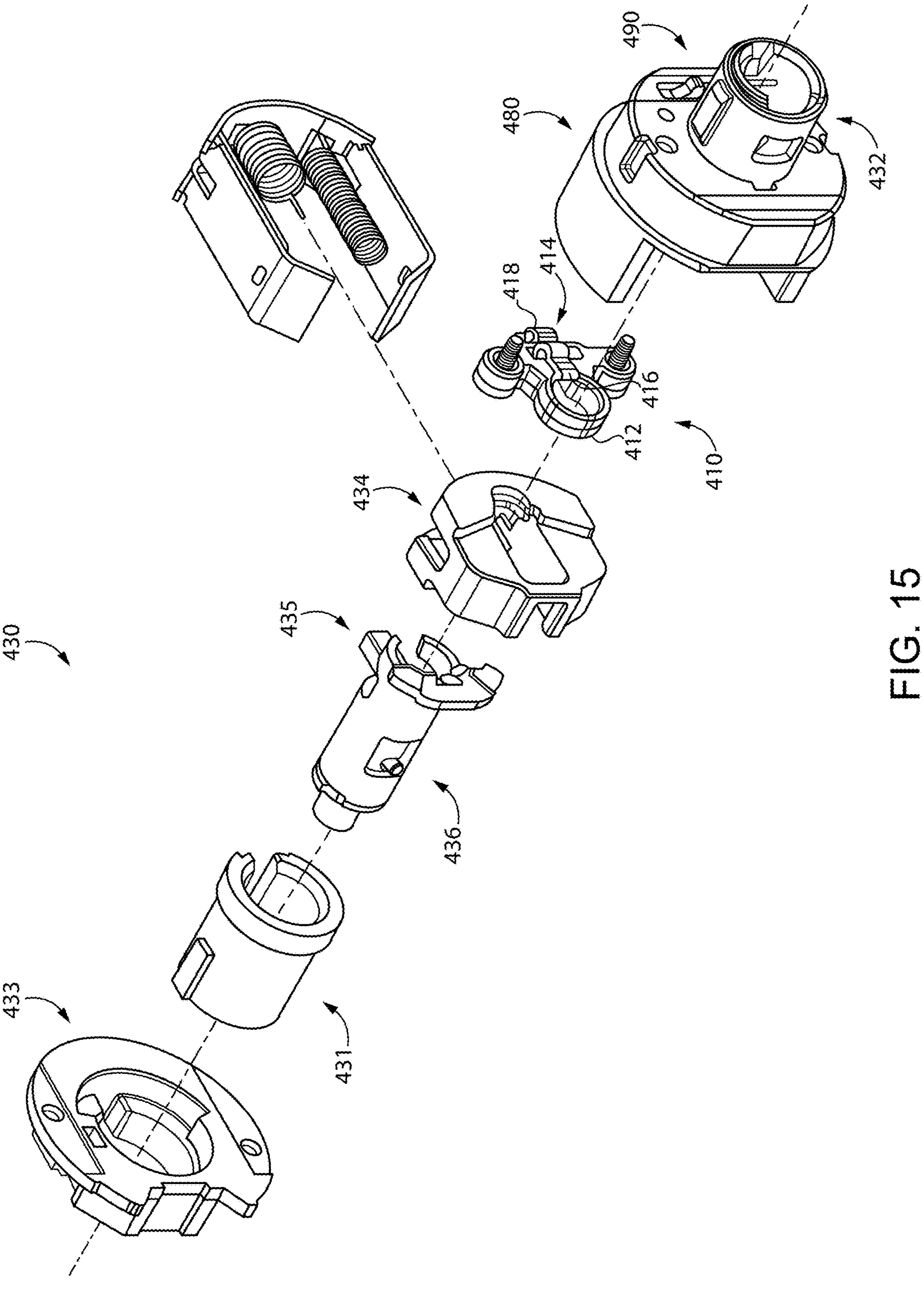
FIG. 15 is an exploded assembly view of a lockset chassis according to certain embodiments.

With additional reference to FIG. 15, illustrated therein is a chassis 430 that may be utilized as the chassis 130 in certain embodiments. The chassis 430 generally includes a first chassis spindle 431, a second chassis spindle 432, a body portion 433, a shuttle 434, a control lug 435, a cam assembly 436, a housing component 480, and a pair of pivot cranks 490, which respectively correspond to the first chassis spindle 131, second chassis spindle 132, body portion 133, shuttle 134, control lug 135, cam assembly 136, housing component 180, and pivot cranks 190 of the above-described chassis 130. While other forms are contemplated, in the illustrated embodiment, the first chassis spindle 431 is an outside chassis spindle, the second chassis spindle 432 is an inside chassis spindle, and the housing component 480 (including the pivot cranks 490) is positioned on the interior side of the chassis 430. As described herein, the chassis 430 may be utilized as the chassis 130 in embodiments in which the consumer wishes to provide the indicator assembly 200 on the interior side of the lockset 100.

The illustrated chassis 430 also includes a reversing mechanism 410, which may be mounted to the housing component 480 in the vicinity of the pivot cranks 490 such that the reversing mechanism 410 is operable to actuate the active pivot crank 490 in response to an actuating input provided by a user (e.g., by actuating a lock state selector). The illustrated reversing mechanism 410 generally includes a mounting bracket 412 and a reversing lever 414 pivotably mounted to the mounting bracket 412. The reversing lever 414 includes an input arm 416 operable to be engaged by a lock state selector, and an output arm 418 operable to engage the active pivot crank 190. As described herein, the reversing mechanism 410 is configured to reverse the direction of the actuating input from the lock state selector to thereby drive a moving component 138 (e.g., the output arm 418) in a direction opposite that of the actuating input. The reversing lever is another example of a rotary component configured to rotate as the lockset transitions between the first lockset state and the second lockset state.

Figure 16:
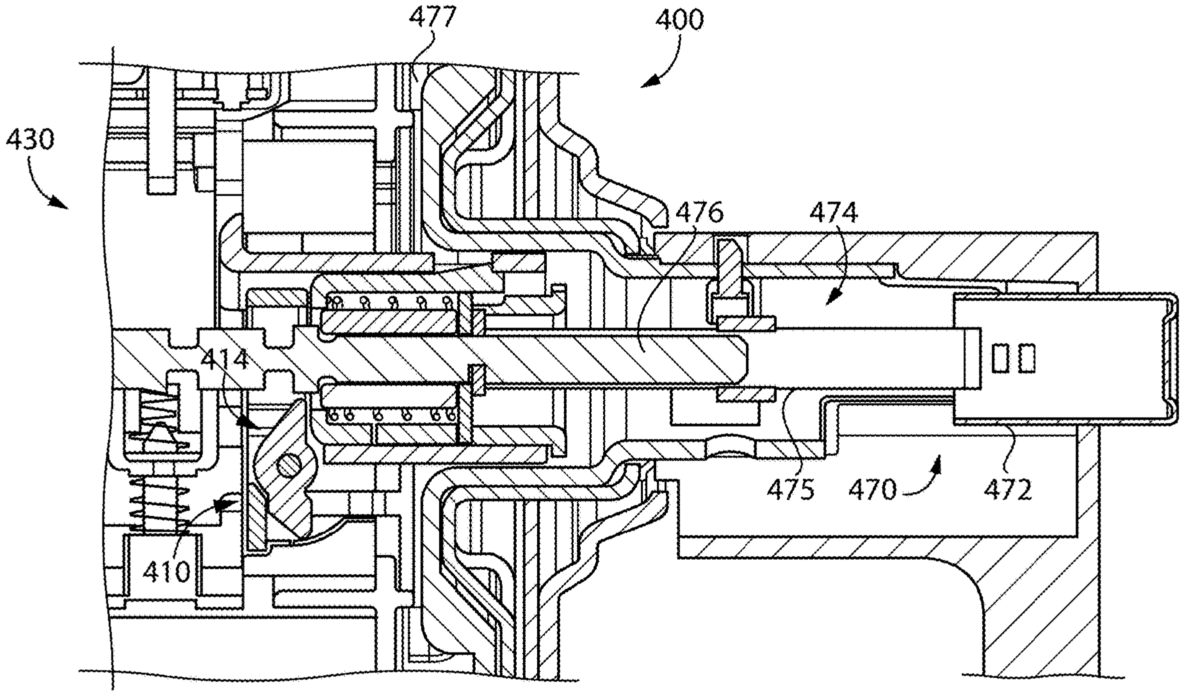
FIG. 16 is a cross-sectional view of a portion of a lockset in a first lockset state, in which the lockset places an indicator assembly in a first indicator assembly state.
Figure 17:
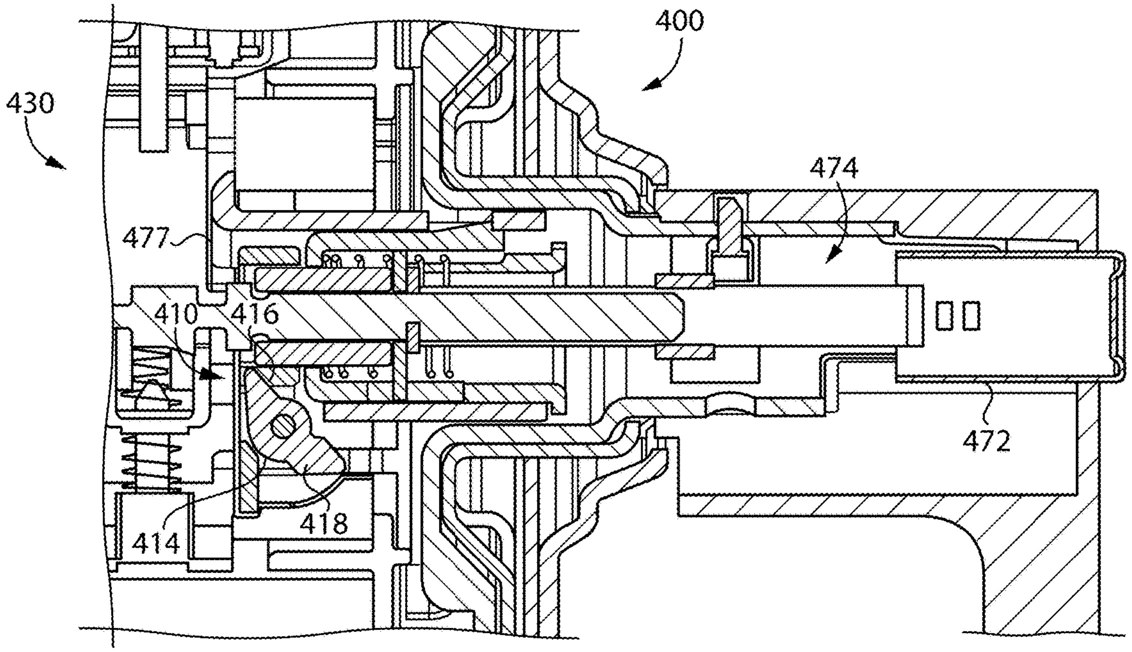
FIG. 17 is a cross-sectional view of the portion of the lockset in a second lockset state, in which the lockset places the indicator assembly in a second indicator assembly state.

With additional reference to FIGS. 16 and 17, illustrated therein is an example lockset 400 including the chassis 430 and the indicator assembly 200, which is provided to the interior handleset of the lockset 400. The lockset 400 also includes a lock state selector 470, which in the illustrated form is provided in the form of a pushbutton lock state selector. The lock state selector 470 generally includes a pushbutton 472 and a plunger assembly 474 coupled with the pushbutton 472. The plunger assembly 474 generally includes a first plunger 475, a second plunger 476 coupled with the first plunger 475, and a sleeve 477 coupled with the second plunger 476. As is typical of pushbutton lock state selectors, depression of the pushbutton 472 causes the cam assembly 436 to move the control lug 435 from its unlocking position to its locking position, thereby locking the lockset 400.

With the lockset 400 in its unlocked state (FIG. 16), the pushbutton 472 is in its projected position, and the plunger assembly 474 is disengaged from the reversing lever 414. As the pushbutton 472 is depressed to lock the lockset 400, a portion of the plunger assembly 474 (e.g., the sleeve 477) drives the input arm 416 of the reversing lever 414 in a first direction (to the left in FIGS. 16 and 17), thereby driving the output arm 418 in an opposite second direction (to the right in FIGS. 16 and 17). Movement of the output arm 418 in the second direction causes the output arm 418 to engage the active pivot crank 490, thereby driving the active pivot crank 490 to the second pivot crank position and driving the indicator assembly 200 to its second state in a manner analogous to that described above.

Figure 19:
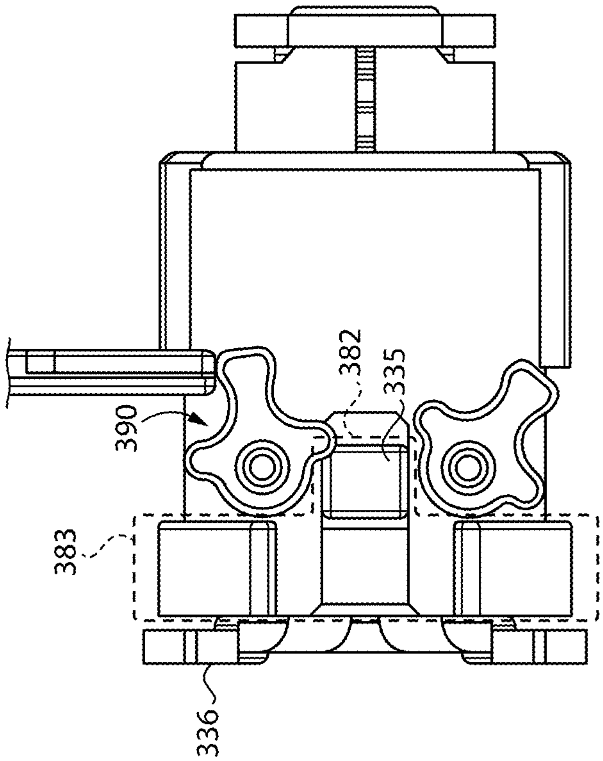
FIG. 19 is a plan view of the portion of the locked stationary chassis in a locked state.
Figure 18:
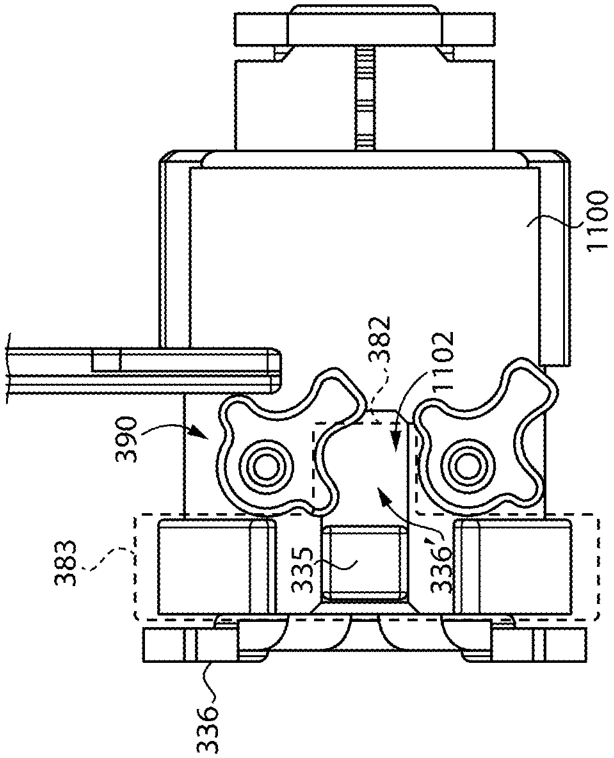
FIG. 18 is a plan view of a portion of a locked stationary chassis in an unlocked state.

With additional reference to FIGS. 18 and 19, illustrated therein are certain example features associated with a locked stationary chassis spindle 1100. More particularly, FIG. 18 illustrates a portion of a locked stationary chassis in an unlocked state similar to that illustrated in FIG. 13, and FIG. 19 illustrates the portion of the locked stationary chassis in a locked state similar to that illustrated in FIG. 14. The illustrated chassis spindle 1100 includes a longitudinal slot 1102, and the keycam shell 336 includes a corresponding longitudinal slot 336'. A portion of the control lug 335 extends through the slots 336', 1102 and into the housing component 380.

When the control lug 335 is in its unlocking position (FIG. 18), the control lug 335 extends into the circumferential channel 383 of the housing component 380 such that the control lug 335 is rotatable relative to the housing component 380. Additionally, by extending through the aligned slots of the chassis spindle 1100 and the keycam shell 336, the control lug 335 rotationally couples the keycam shell 336 and the chassis spindle 1100. As a result, rotation of the outside handle 114 is transmitted via the spindle 1100 and the control lug 335 to the keycam shell 336, and rotation of the keycam shell 336 retracts the shuttle 334 for actuation of the latch mechanism. As such, the chassis is in an unlocked state, in which the outside handle is operable to actuate the latch mechanism.

When the control lug 335 is in its locking position (FIG. 19), the control lug 335 extends into the longitudinal channel 382 of the housing component 380 such that the control lug 335 is rotationally locked to the housing component 380. As a result, the control lug 335 prevents rotation of the chassis spindle 1100 and the keycam shell 336, thereby preventing rotation of the outside handle 114. As such, when the chassis including the locked stationary spindle 1100 is in the locked state, the outside handle 114 is locked stationary in a fixed orientation.

Figure 21:
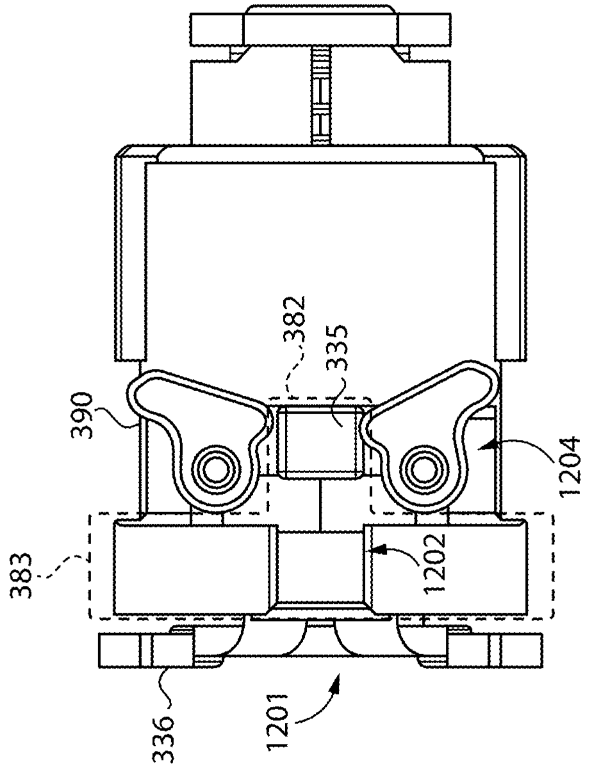
FIG. 21 is a plan view of the portion of the freewheeling chassis in a locked state.
Figure 20:
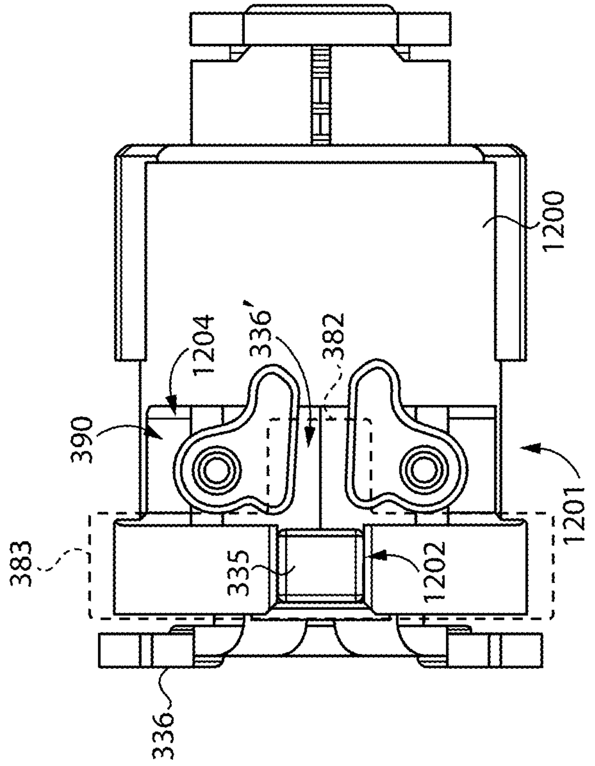
FIG. 20 is a plan view of a portion of a freewheeling chassis in an unlocked state.

With additional reference to FIGS. 20 and 21, illustrated therein are certain example features associated with a freewheeling chassis spindle 1200. More particularly, FIG. 20 illustrates a portion of a freewheeling chassis in an unlocked state similar to that illustrated in FIG. 13, and FIG. 21 illustrates the portion of the freewheeling chassis in a locked state similar to that illustrated in FIG. 14. The illustrated chassis spindle 1200 includes an aperture 1201 through which the control lug 335 extends. The aperture 1201 includes a longitudinally-extending unlocking slot 1102 and a circumferentially-extending locking slot. As noted above, the keycam shell 336 includes a longitudinal slot 336'. A portion of the control lug 335 extends through the slot 336' and the aperture 1201, and into the housing component 380.

When the control lug 335 is in its unlocking position (FIG. 20), the control lug 335 extends into the circumferential channel 383 of the housing component 380 such that the control lug 335 is rotatable relative to the housing component 380. In this position, the control lug 335 also extends through the unlocking slot 1202 of the aperture 1201. By extending through the unlocking slot 1202 of the chassis spindle 1200 and the longitudinal slot 336' of the keycam shell 336, the control lug 335 rotationally couples the keycam shell 336 and the chassis spindle 1200. As a result, rotation of the outside handle 114 is transmitted via the spindle 1200 and the control lug 335 to the keycam shell 336, and rotation of the keycam shell 336 retracts the shuttle 334 for actuation of the latch mechanism. As such, the chassis is in an unlocked state, in which the outside handle is operable to actuate the latch mechanism.

When the control lug 335 is in its unlocking position (FIG. 21), the control lug 335 extends into the longitudinal channel 382 of the housing component 380 such that the control lug 335 is rotationally locked to the housing component 380. As with the embodiment described above, the control lug 335 also rotationally locks the keycam shell 336 to the housing component 380. In this configuration, however, the control lug 335 extends into the housing channel 382 via the locking slot 1204, which extends circumferentially. As a result, the chassis spindle 1200 (and thus the outside handle 114) is capable of a certain degree of rotation, while the keycam shell 336 remains locked to the housing component 380 to prevent retraction of the shuttle 340 for actuation of the latch mechanism. As such, when the chassis including the freewheeling spindle 1200 is in the locked state, the outside handle 114 is able to freewheel or rotate through a predetermined angle, but such rotation does not actuate the latch mechanism.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An indicator assembly for a lockset having a first lockset state and a second lockset state, the indicator assembly comprising:

an indicator operable to selectively display a first indicium relating to the first lockset state;

an indicator lever having a first indicator lever position in which the indicator lever causes the indicator to display the first indicium, and a second indicator lever position in which the indicator does not display the first indicium;

an actuating lever operable to drive the indicator lever between the first indicator lever position and the second indicator lever position as the actuating lever moves between a first actuating lever position and a second actuating lever position; and a slider operable to drive the actuating lever between the first actuating lever position and the second actuating lever position as the slider moves between a first slider position and a second slider position;

wherein the actuating lever and the slider are engaged with one another via a lost motion connection and a spring; and wherein the slider is configured to move from the first slider position to the second slider position in response to an actuating input provided by the lockset.

2. The indicator assembly of claim 1, wherein, with movement of the actuating lever from the first actuating lever position to the second actuating lever position blocked, the lost motion connection is configured to permit the slider to move from the first slider position to the second slider position without moving the actuating lever to the second actuating lever position; and wherein, with movement of the actuating lever from the first actuating lever position to the second actuating lever position permitted, the spring is configured to drive the actuating lever from the first actuating lever position toward the second actuating lever position in response to movement of the slider from the first slider position to the second slider position.

3. The indicator assembly of claim 1, wherein the indicator comprises an indicator sign including the first indicium relating to the first lockset state and a second indicium relating to the second lockset state;

wherein the indicator sign has a first indicator sign position in response to the first indicator lever position, and is configured to display the first indicium via a window when in the first indicator sign position; and wherein the indicator sign has a second indicator sign position in response to the second indicator lever position, and is configured to display the second indicium via the window when in the second indicator sign position.

4. An indicator assembly for a lockset having a first lockset state and a second lockset state, the indicator assembly comprising:

an indicator operable to selectively display a first indicium relating to the first lockset state;

an indicator lever having a first indicator lever position in which the indicator lever causes the indicator to display the first indicium, and a second indicator lever position in which the indicator does not display the first indicium;

an actuating lever operable to drive the indicator lever between the first indicator lever position and the second indicator lever position as the actuating lever moves between a first actuating lever position and a second actuating lever position, wherein the actuating lever comprises a counterweight urging the actuating lever toward the second actuating lever position; and a slider operable to drive the actuating lever between the first actuating lever position and the second actuating lever position as the slider moves between a first slider position and a second slider position, wherein the slider is configured to move from the first slider position to the second slider position in response to an actuating input provided by the lockset.

5. An indicator assembly for a lockset having a first lockset state and a second lockset state, the indicator assembly comprising:
an indicator operable to selectively display a first indicium relating to the first lockset state;
an indicator lever having a first indicator lever position in which the indicator lever causes the indicator to display the first indicium, and a second indicator lever position in which the indicator does not display the first indicium;
an actuating lever operable to drive the indicator lever between the first indicator lever position and the second indicator lever position as the actuating lever moves between a first actuating lever position and a second actuating lever position; and
a slider operable to drive the actuating lever between the first actuating lever position and the second actuating lever position as the slider moves between a first slider position and a second slider position, wherein the slider is configured to move from the first slider position to the second slider position in response to an actuating input provided by the lockset;
wherein the indicator lever comprises a bearing surface operable to engage the indicator;
wherein the bearing surface is displaced by a bearing surface displacement as the indicator lever moves from the first indicator lever position to the second indicator lever position;
wherein the slider is displaced by a slider displacement as the slider moves from the first slider position to the second slider position; and
wherein the bearing surface displacement is greater than the slider displacement.

6. An apparatus for a lockset having a first lockset state and a second lockset state, the apparatus comprising:
an indicator operable to selectively display a first indicium relating to the first lockset state;
an indicator lever having a first indicator lever position in which the indicator lever causes the indicator to display the first indicium, and a second indicator lever position in which the indicator does not display the first indicium;
an actuating lever operable to drive the indicator lever between the first indicator lever position and the second indicator lever position as the actuating lever moves between a first actuating lever position and a second actuating lever position;
a spring cage defining a boundary between an interior region within a footprint of the spring cage and an exterior region outside the footprint of the spring cage; and
a slider operable to drive the actuating lever between the first actuating lever position and the second actuating lever position as the slider moves between a first slider position and a second slider position, wherein the slider is configured to move from the first slider position to the second slider position in response to an actuating input provided by the lockset, and wherein the slider extends between the interior region and the exterior region.

7. The indicator assembly of claim 6, wherein the slider receives the actuating input in the interior region.

8. A lockset having a first lockset state and a second lockset state, the lockset comprising:
an indicator operable to selectively display a first indicium relating to the first lockset state;
an indicator lever having a first indicator lever position in which the indicator lever causes the indicator to display the first indicium, and a second indicator lever position in which the indicator does not display the first indicium;
an actuating lever operable to drive the indicator lever between the first indicator lever position and the second indicator lever position as the actuating lever moves between a first actuating lever position and a second actuating lever position;
a slider operable to drive the actuating lever between the first actuating lever position and the second actuating lever position as the slider moves between a first slider position and a second slider position;
a movable component that moves as the lockset transitions between the first lockset state and the second lockset state; and
a pivot crank operable to pivot in response to movement of the movable component; and
wherein the slider is configured to move from the first slider position to the second slider position in response to pivotal movement of the pivot crank.

9. The lockset of claim 8, wherein the movable component is configured to move along a first axis as the lockset transitions between the first lockset state and the second lockset state;
wherein the slider is configured to slide along a second axis in response to the actuating input; and
wherein the first axis and the second axis are transverse to one another.

10. A method, comprising:
causing a slider to perform a slider movement in response to movement of a lockset from a first lockset state to a second lockset state, wherein the slider movement results in a slider displacement;
causing a transmission engaged with the slider to at least selectively perform a transmission movement in response to the slider movement; and
causing an indicator sign engaged with the transmission to perform an indicator sign movement in response to the transmission movement, wherein the indicator sign movement results in an indicator sign displacement;
wherein the transmission provides a mechanical advantage such that the indicator sign displacement is greater than the slider displacement; and
wherein the transmission comprises an actuating lever operationally connected to the indicator sign and engaged with the slider via a lost motion connection between the actuating lever and the slider.

11. The method of claim 10, wherein the transmission further comprises an indicator lever engaged with the indicator sign; and
wherein the transmission movement comprises an actuating lever movement and an indicator lever movement.

12. The method of claim 11, wherein the actuating lever movement comprises a first pivotal actuating lever movement about a first pivot axis; and
wherein the indicator lever movement comprises a first pivotal indicator lever movement about a second pivot axis.

13. The method of claim 10, wherein the indicator sign movement comprises movement of the indicator sign from a first indicator sign position to a second indicator sign position;

wherein the indicator sign in the first indicator sign position displays a first indicium relating to the first lockset state; and wherein the indicator sign in the second indicator sign position displays a second indicium relating to the second lockset state.

14. The method of claim 10, wherein causing the transmission to at least selectively perform the transmission movement in response to the slider movement comprises:

causing the lost motion connection to permit the slider movement when the transmission movement is blocked.

15. The method of claim 14, wherein the transmission further comprises an anti-jam spring between the actuating lever and the slider.

16. The method of claim 15, wherein causing the transmission to at least selectively perform the transmission movement in response to the slider movement further comprises causing the anti-jam spring to drive the transmission in the transmission movement in response to the slider movement when the transmission movement is not blocked.

17. A lockset having a locked state and an unlocked state, the lockset comprising:

a movable component configured to move along a longitudinal axis as the lockset transitions between the locked state and the unlocked state;

a first rotary component mounted for rotation about a first rotational axis in response to movement of the movable component along the longitudinal axis, wherein the first rotational axis is transverse to the longitudinal axis;

a slider configured to move along a slider axis in response to rotation of the first rotary component about the first rotational axis;

a first lever operationally connected to the slider; and an indicator sign operationally connected to a second lever; and wherein the indicator sign, via the first and second levers, is configured to move between a lock-indicating position and an unlock-indicating position in response to movement of the slider along the slider axis.

18. The lockset of claim 17, further comprising a second rotary component mounted for rotation about a second rotational axis in response to rotation of the first rotary component about the first rotational axis; and wherein the second rotational axis is transverse to the longitudinal axis.

19. The lockset of claim 18, wherein the slider is configured to move along the slider axis in response to rotation of the second rotary component about the second rotational axis.

* * * * *